(12) United States Patent
Segnit

(10) Patent No.: US 12,062,929 B2
(45) Date of Patent: *Aug. 13, 2024

(54) MODULAR CHARGING SYSTEM AND WALL-MOUNTED CHARGING DEVICE AND MODULAR POWER DEVICES

(71) Applicant: Mischievous LLC, Cornwall on Hudson, NY (US)

(72) Inventor: Seymour Segnit, Cornwall on Hudson, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/960,300

(22) Filed: Oct. 5, 2022

(65) Prior Publication Data
US 2023/0045143 A1 Feb. 9, 2023

Related U.S. Application Data

(63) Continuation of application No. 17/180,750, filed on Feb. 20, 2021, now Pat. No. 11,502,519, which is a continuation of application No. 16/898,366, filed on Jun. 10, 2020, now Pat. No. 10,931,127, which is a continuation of application No. 15/950,081, filed on Apr. 10, 2018, now abandoned.

(60) Provisional application No. 62/457,510, filed on Feb. 10, 2017.

(51) Int. Cl.
*H02J 7/00* (2006.01)
*H02J 50/10* (2016.01)

(52) U.S. Cl.
CPC .......... *H02J 7/0013* (2013.01); *H02J 7/0042* (2013.01); *H02J 7/0047* (2013.01); *H02J 7/0025* (2020.01); *H02J 7/0045* (2013.01); *H02J 50/10* (2016.02)

(58) Field of Classification Search
CPC ........ H02J 7/0045; H02J 7/0021; H02J 7/025; H02J 7/0013; H02J 7/0047; H02J 7/0042; H02J 50/10
USPC .......................... 320/108, 109, 115, 117, 138
See application file for complete search history.

(56) References Cited

U.S. PATENT DOCUMENTS

| | | | | |
|---|---|---|---|---|
| RE46,391 E | * | 5/2017 | Jung | H02J 50/80 |
| 10,562,404 B1 | * | 2/2020 | Khaligh | H02M 1/12 |
| 10,804,727 B2 | * | 10/2020 | Gu | H02J 50/80 |
| 10,931,127 B2 | * | 2/2021 | Segnit | H02J 7/0047 |
| 11,201,500 B2 | * | 12/2021 | Partovi | H02J 50/10 |
| 11,316,371 B1 | * | 4/2022 | Partovi | G06F 1/1635 |
| 11,329,511 B2 | * | 5/2022 | Partovi | H02J 50/90 |
| 11,342,777 B2 | * | 5/2022 | Partovi | H02J 50/40 |
| 11,411,433 B2 | * | 8/2022 | Partovi | G06F 1/1635 |
| 11,462,942 B2 | * | 10/2022 | Partovi | H02J 50/402 |
| 11,502,519 B2 | * | 11/2022 | Segnit | H02J 7/0013 |
| 11,569,685 B2 | * | 1/2023 | Partovi | H02J 7/00714 |

(Continued)

*Primary Examiner* — Phallaka Kik
(74) *Attorney, Agent, or Firm* — Wood Herron & Evans LLP

(57) ABSTRACT

The present invention relates a modular charging system, including a wall-mounted outlet-preserving charger for powering and charging additional accessories, such as battery blocks, wireless device chargers, supporting chargers for wearable devices such as watches, and car chargers, each for use independently or in combination with electronic devices. The present invention typically includes a wall charger with one or more electrical outlets on the front face so that the use of the wall outlet is not lost. The wall charger of the present invention is suitable for use in any major country and may be adapted to the outlet configuration and voltage of those countries.

26 Claims, 33 Drawing Sheets

(56) References Cited

U.S. PATENT DOCUMENTS

| | | | | |
|---|---|---|---|---|
| 11,837,891 | B2* | 12/2023 | Segnit | H02J 7/0047 |
| 2011/0127959 | A1* | 6/2011 | McGary | H02J 7/0044 |
| | | | | 320/114 |
| 2012/0146576 | A1* | 6/2012 | Partovi | H02J 7/0044 |
| | | | | 320/108 |
| 2012/0235636 | A1* | 9/2012 | Partovi | H04B 5/0093 |
| | | | | 320/108 |
| 2014/0084862 | A1* | 3/2014 | Kawaguchi | B60L 53/65 |
| | | | | 320/108 |
| 2015/0326060 | A1* | 11/2015 | Young | H02J 50/402 |
| | | | | 320/108 |
| 2016/0056649 | A1* | 2/2016 | Chen | H02J 7/0042 |
| | | | | 320/111 |
| 2016/0056664 | A1* | 2/2016 | Partovi | H02J 7/0042 |
| | | | | 307/104 |
| 2017/0110910 | A1* | 4/2017 | Zeine | H02J 50/80 |
| 2017/0197517 | A1* | 7/2017 | Jamieson | B60L 53/62 |
| 2018/0019610 | A1* | 1/2018 | Gu | H02J 7/00034 |
| 2018/0166906 | A1* | 6/2018 | Malhotra | A45C 15/00 |
| 2019/0097448 | A1* | 3/2019 | Partovi | H02J 50/12 |
| 2020/0065536 | A1* | 2/2020 | Utykanski | H02J 7/0047 |
| 2022/0069632 | A1* | 3/2022 | Partovi | H02J 50/50 |
| 2022/0255352 | A1* | 8/2022 | Partovi | H02J 50/90 |
| 2022/0255369 | A1* | 8/2022 | Partovi | H02J 7/0044 |
| 2022/0329106 | A1* | 10/2022 | Partovi | H02J 50/12 |
| 2023/0045760 | A1* | 2/2023 | Segnit | H02J 7/0042 |
| 2023/0326671 | A1* | 10/2023 | Partovi | H02M 3/01 |
| | | | | 307/31 |

* cited by examiner

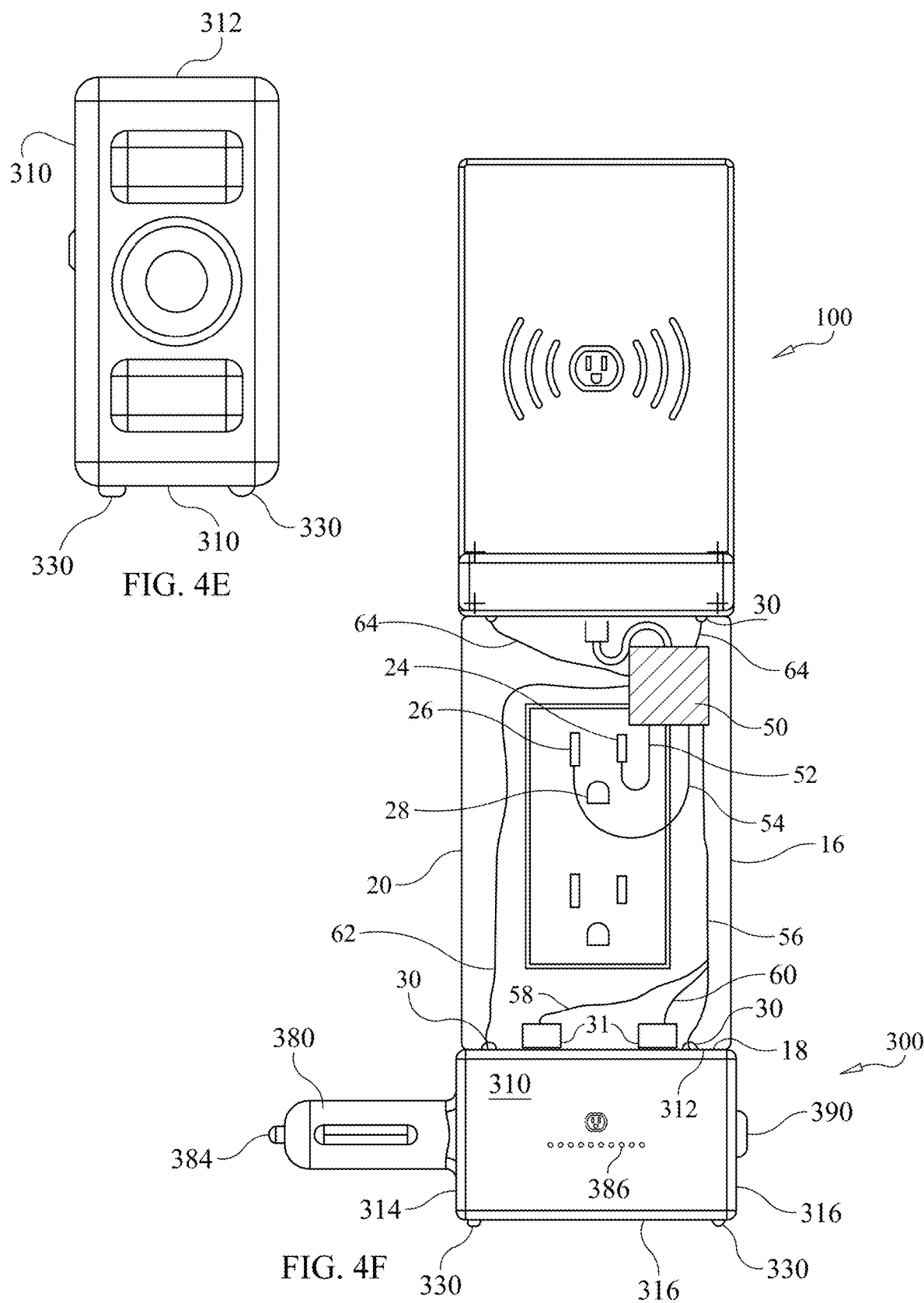

MODULAR CHARGING SYSTEM AND WALL-MOUNTED CHARGING DEVICE AND MODULAR POWER DEVICES

CROSS-REFERENCES TO RELATED APPLICATIONS

This application claims priority to U.S. patent application Ser. No. 17/180,750, filed Feb. 20, 2021, now U.S. Pat. No. 11,502,519, entitled "Modular Charging and System Wall-Mounted Charging Device and Modular Power Devices", which application Ser. No. 17/180,750, claims priority to U.S. patent application Ser. No. 16/898,366, filed Jun. 10, 2020, now U.S. Pat. No. 10,931,127 issued Feb. 23, 2021, entitled "Modular Charging and System Wall-Mounted Charging Device and Modular Power Devices", which application Ser. No. 16/898,366 claims priority to U.S. patent application Ser. No. 15/950,081, filed Apr. 10, 2018, now abandoned, entitled "Modular Charging and System Wall-Mounted Charging Devices and Modular Power Devices", which application Ser. No. 15/950,081 claims priority to U.S. Prov. App. No. 62/457,510, filed Feb. 10, 2017, now expired, entitled "Modular Charging and System Wall-Mounted Charging Device and Modular Outlet Extended", all of which are incorporated by reference.

FIELD

The present invention relates to modular charging systems, including wall-mounted outlet-preserving chargers for powering and charging additional accessories for use with electronic components such as battery blocks, wireless device chargers, supporting chargers for wearable devices such as watches, and car chargers, each for use independently or in combination with electronic devices.

BACKGROUND

With many charging systems for electronic devices, the transformer base unit is hardwired to the cable and is suitable only for use with a single type of electronic device. In other configurations, the base unit includes a standardized bus port, such as a Universal Serial Bus (USB) or other manufacturer-specific port. With the proliferation of mobile phones, e-readers, tablets, notepad computers, and other portable electronic devices, the storage and sorting of charges has become burdensome. Sorting base units and cables for any number of electronic devices consumes time, storage space, and space on a wall outlet or on a power strip.

SUMMARY

In one aspect, a novel wall-mounted charging device and modular outlet extender is featured which may be inserted into a standard wall outlet without additional wires and which provides a platform for charging an electrical device without intruding into the environment of the user. The wall-mounted charging device and modular outlet extender provides a housing, at least one electrical outlet, at least one set of electrical connection prongs, and an auxiliary charging port formed on a top wall of the housing. The top wall supports an electrical device while it is connected to the auxiliary charging port for charging. In a further aspect, the wall-mounted charging device and modular outlet extender may also include a removable charging tip extending from the auxiliary charging port formed on the top wall, and a second auxiliary port formed on a bottom wall of the housing. In a further aspect, the device may also include a plurality of auxiliary ports formed in the bottom wall of the housing and one or more auxiliary ports formed in sidewalls of the housing. The device may generally also include a power supply unit providing low-voltage power to the auxiliary ports so that low-voltage power is provided to the electrical device for charging. The device may also include other features in the housing such as a GFI (ground fault interrupter), a surge protector, a mechanical power interruption switch, a Wi-Fi extender, a Thunderbolt® (Apple, Inc.) connection, a USB connector, a Micro USB connector, an HDMI™ (High-Definition Multimedia Interface) connector, an Ethernet connector, any other industry-standard connector, or may include a remote-control unit or an audio connector. Also included may be modular charging devices such as battery blocks, wireless device chargers, supporting chargers for wearable devices such as watches, and car chargers. Each component may be used to charge an electronic device either alone or in conjunction with other components. Also included may be one or more electrical outlets on a front face so that the use of the wall outlet is not lost. The wall charger is suitable for use in any major country and may be adapted to the outlet configuration and voltage of those countries.

BRIEF DESCRIPTION OF THE DRAWINGS

A more complete appreciation of the invention and the various embodiments thereof will be readily obtained as the same becomes better understood by reference to the following detailed description when considered in connection with the accompanying drawings. The drawings are incorporated in, and constitute part of, this specification, illustrate several embodiments consistent with the invention and, together with the description, serve to explain the principles of the invention.

FIG. 4E is a side elevation view of an accessory car charger suitable for use with a modular charging system in accordance with the present invention.

FIG. 4F is a front elevation view and partial schematic of an accessory car charger mounted to an underside of an outlet wall-mounted charging device, with a wireless charge unit mounted to the top side in accordance with the present invention.

DETAILED DESCRIPTION AND PREFERRED EMBODIMENTS OF THE INVENTION

The wall mounted charging device of the present invention enables a charging station to be provided on a wall outlet without obstructing the receptacle of the outlet. The charging device of the present invention provides a utilitarian and aesthetically pleasing solution to the issue of blocked receptacles, wire tangles and unsightly wall mounted chargers. The charging device of the present invention may be doubled up to provide two or more charging stations. The device also is available with multiple charging tips to provide flexibility in charging devices of different generations and different manufacturers, essentially any rechargeable device may be installed on the wall charger with a suitable charging tip installed.

Figure 1A:
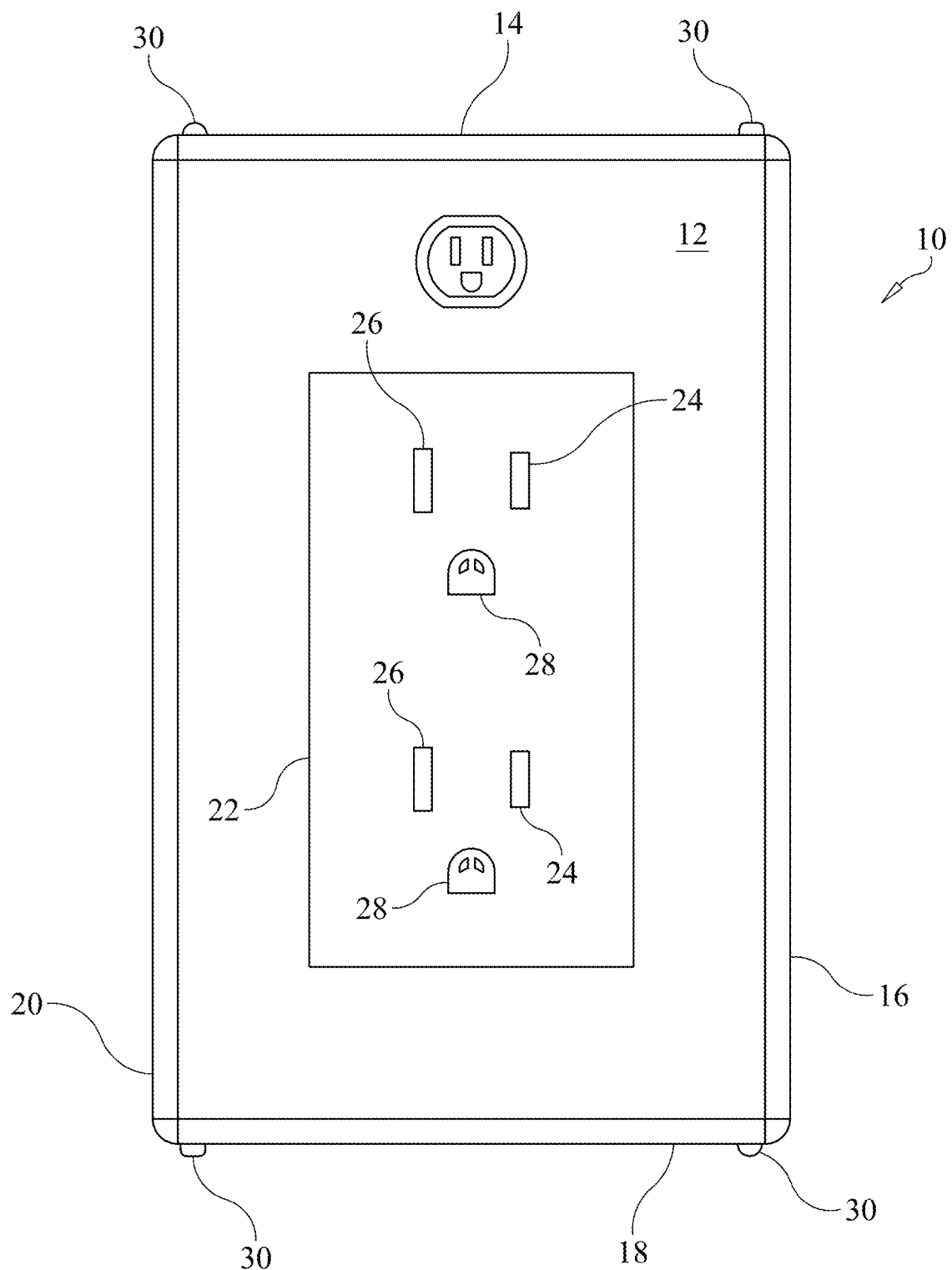
FIG. 1A is a front elevation view of a wall-mounted charging device and modular outlet extender in accordance with the present invention.

FIG. 1A shows a wall-mounted charging device and modular outlet extender of the present invention in which the base charging device 10 includes a front face 12, a top wall 14, a right-side wall 16, a bottom wall 18, and a left side wall 20. Front face includes an outlet plate that includes two outlets 22, each with a 120V AC "hot" receptacle 24, a neutral receptacle 26 and ground receptacle 28. In top wall, a receptacle (not shown) is formed for receiving any of a number of charging tips suitable for use with various electronic components. The 120V AC and receptacle configuration shown is typically suitable for use in North America, it is within the scope of this invention to accommodate voltages and receptacle configurations for world-wide usage. Charging device 10 is mounted to a wall outlet and protrudes from the wall by a minimal distance. The receptacle, with a charging tip installed forms a charging dock that allows an electronic device to be placed atop charging device so that the device is charged in a convenient location without obstructing the outlets on outlet plate.

The top surface receptacle is formed for receiving a number of charging tips suitable for use with various electronic components. A charging tip installed forms a charging dock that allows an electronic device to be placed atop charging device so that the device is charged in a convenient location without obstructing the outlets on outlet plate. Also, on the top and/or bottom surface are electronic connections 30 to be matched to connections on modular components as set forth hereinbelow. The electronic connections may be magnetized for a positive connection between the base and the modular components. Positive and negative connections may be formed in either or both of the top surface 14 and bottom surface 18. Modular components may be connected to the top surface 14 and/or bottom surface 18 for charging power storage in those modular components or allowing the attached modular components to power connected devices. One suitable connection includes extensions 30 on the top and bottom surfaces of the base charging unit a number of indents 230 on one surface of accessories 200 (shown in FIG. 3A) and a number of extensions 230 on the bottom surface such that the indents and extensions mate to form an electrical connection. The accessories may be stacked such that the extensions 230 mate with the indents of a second accessory. While the connections may be of any suitable shape, separate shapes for the positive and negative connections may be preferred such that adjacent devices align with the proper polarity. In one preferred form, one half of the extensions may have a circular cross-section, while the other half of the extensions have a square or rectangular cross-section. Similarly, one half of the indents may have a circular cross-section, while the other half of the indents have a square or rectangular cross-section.

Figure 1B:
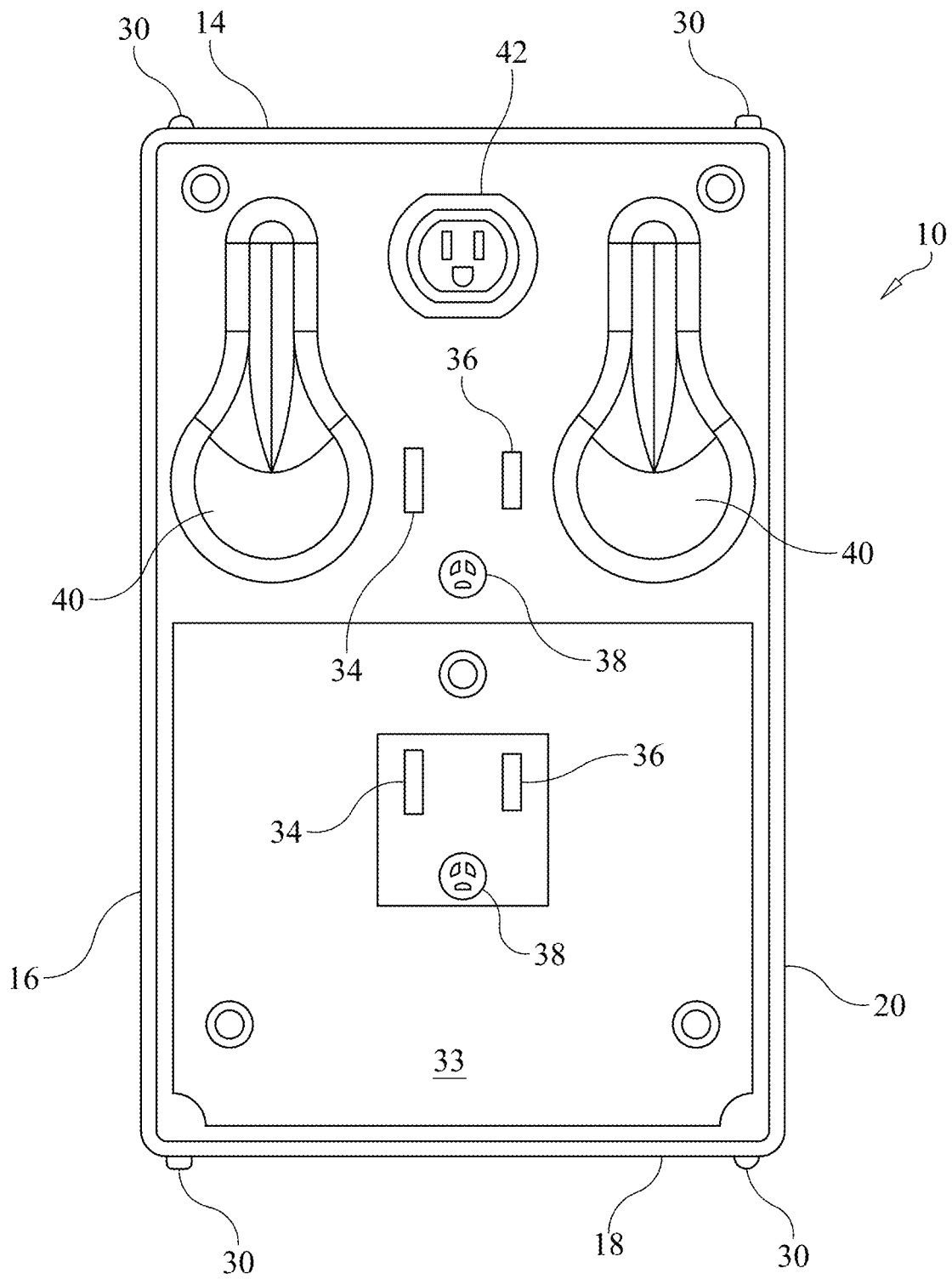
FIG. 1B is a rear elevation view of a wall-mounted charging device and modular outlet extender in accordance with the present invention.

FIG. 1B shows the rear face 33 of the wall-mounted charging device and modular outlet extender of the present invention in which the charging device 10 includes, a top wall 14, a right-side wall 16, a bottom wall 18, and a left side wall 20. The rear face includes an outlet plate that includes two sets of connections, each with a 120V AC "hot" blade 34, a neutral blade 36 and ground blade 38. The 120V AC configuration shown is typically suitable for use in North America, it is within the scope of this invention to accommodate voltages and receptacle configurations for worldwide usage. Rear face 33 may include retaining sections 40 for charge tips and a tip release button 42. Top wall 14 and bottom wall 18 include extension type, electronic connections 30 to be matched to connections on modular components as set forth hereinbelow.

Figure 1C:
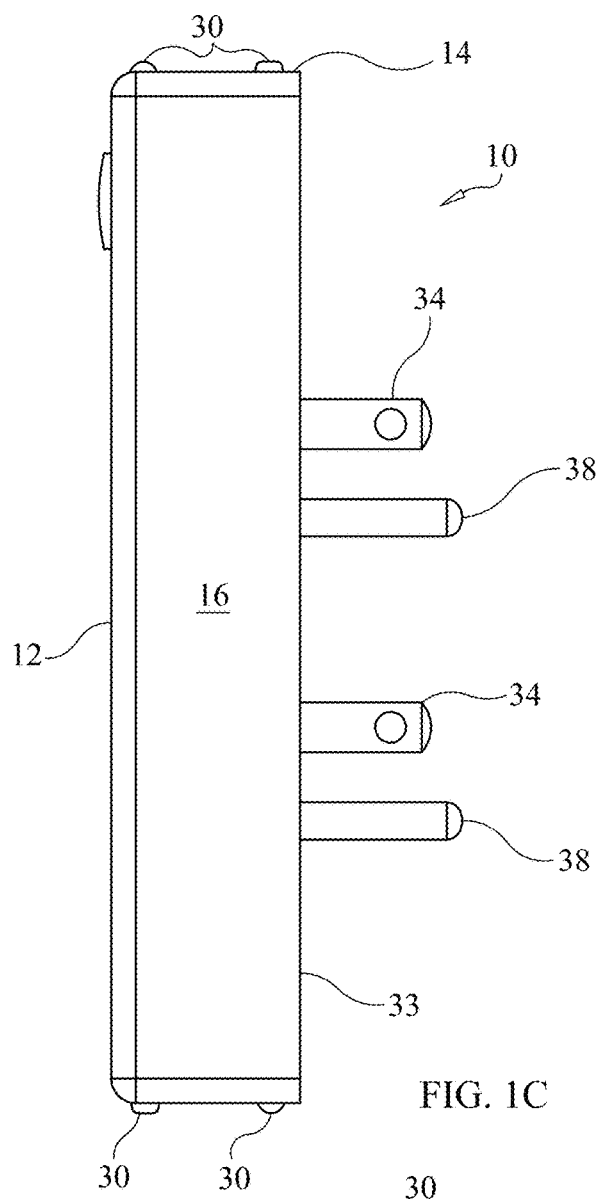
FIG. 1C is a side elevation view of a wall-mounted charging device and modular outlet extender in accordance with the present invention.

FIG. 1C shows the right face 16 of the wall-mounted charging device and modular outlet extender 10 of the present invention in which the charging device 10 includes, a top wall 14, a right-side wall 16, a bottom wall 18, and a left side wall 20 (not shown). The rear face includes two sets of connections, each with a 120V AC "hot" blade 34, a neutral blade 36 and ground blade 38. Top wall 14 and bottom wall 18 include extension type, electronic connections 30 to be matched to indent type electronic connections on modular components as set forth hereinbelow.

Figure 1D:
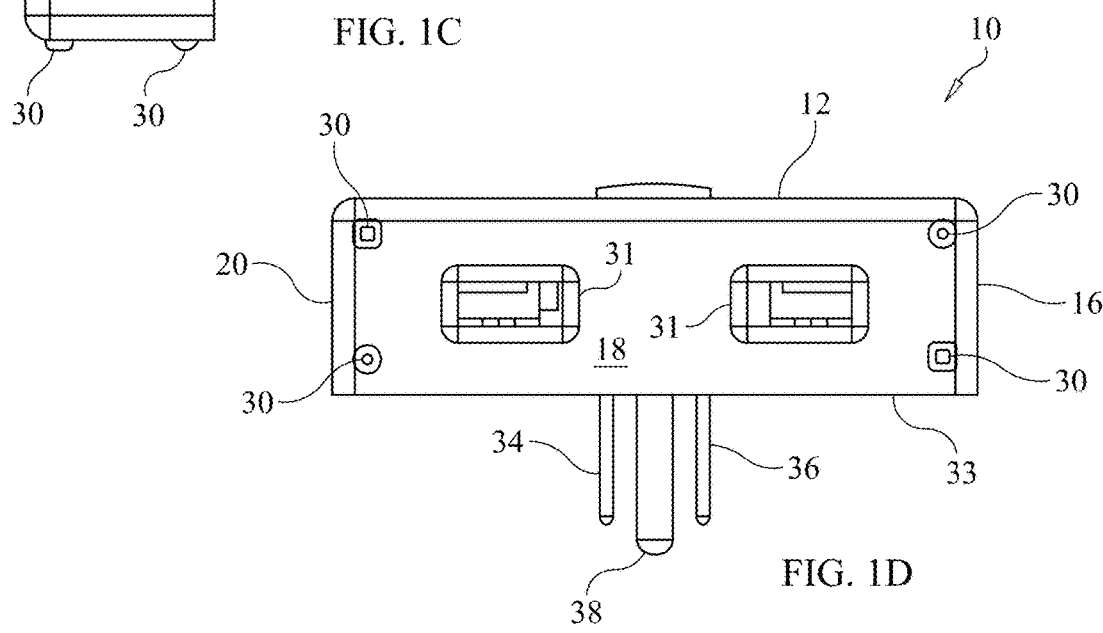
FIG. 1D is a bottom plan view of a wall-mounted charging device and modular outlet extender in accordance with the present invention.

FIG. 1D shows the bottom face 18 of the wall-mounted charging device and modular outlet extender 10 of the present invention in which the charging device 10 includes, a top wall 14 (not shown), a right-side wall 16, a bottom wall 18, and a left side wall 20. The rear face includes two sets of connections, each with a 120V AC "hot" blade 34, a neutral blade 36 and ground blade 38. Bottom wall 18 include extension type, electronic connections 30 in offset square and rectangular cross-sections to be matched to connections on modular components as set forth hereinbelow. Also included in bottom face 18 are connection ports 31, such as USB ports of any type. USB-A or USB-C are typically preferred; however, any desired port mat be used.

Figure 1E:
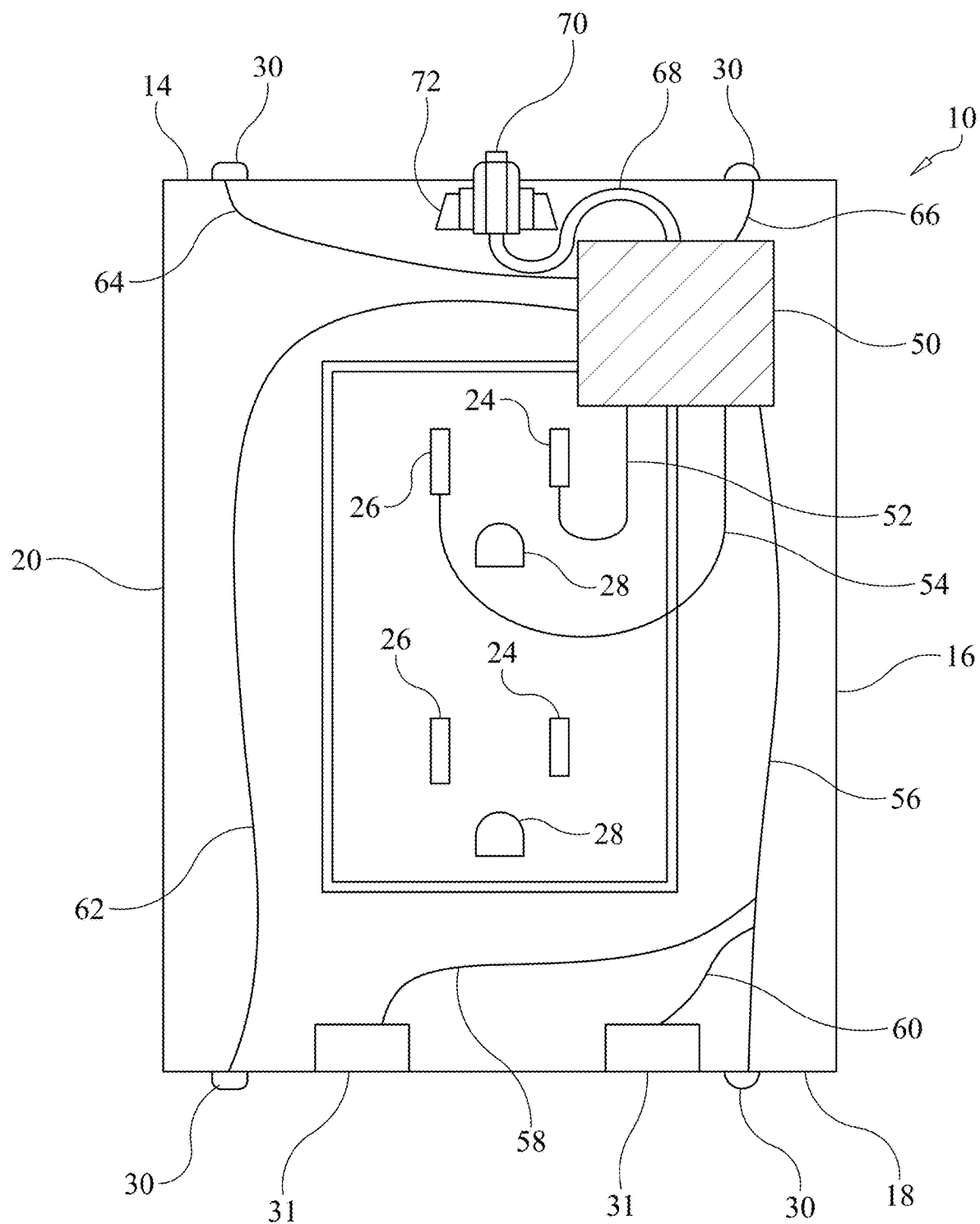
FIG. 1E is a front schematic view of a wall-mounted charging device and modular outlet extender showing the internal electronics in accordance with the present invention.

FIG. 1E shows a schematic view of a wall-mounted charging device and modular outlet extender of the present invention in which the charging device 10 includes a front face 12, a top wall 14, a right-side wall 16, a bottom wall 18, and a left side wall 20. Front face includes an outlet plate that includes two outlets 22, each with a 120V AC "hot" receptacle 24, a neutral receptacle 26 and ground receptacle 28. In top wall, a receptacle (not shown) is formed for receiving any of a number of charging tips suitable for use with various electronic components. The 120V AC and receptacle configuration shown is typically suitable for use in North America, it is within the scope of this invention to accommodate voltages and receptacle configurations for worldwide usage. Charging device 10 is mounted to a wall outlet and protrudes from the wall by a minimal distance. The receptacle, with a charging tip installed forms a charging dock that allows an electronic device to be placed atop charging device so that the device is charged in a convenient location without obstructing the outlets on outlet plate. The top surface receptacle 72 is formed for receiving a number of charging tips 70 suitable for use with various electronic components. A charging tip 70 installed forms a charging dock that allows an electronic device to be placed atop charging device so that the device is charged in a convenient location without obstructing the outlets on outlet plate. As discussed below, the side sections of tip 70 may include serrated sections which a congruent toothed section within receptacle 72 such that release button 42 disengages the serrated section from the toothed section in receptacle 72 to allow the tip to be replaced. Top surface 14 includes extension type, electronic connections 30 to be matched to indent type electronic connections on modular components as discussed below. The lower surface includes a number of extension type electronic connections 30 to be matched to connections on modular components as set forth hereinbelow. The electronic connections may be magnetized for a positive connection between the base and the modular components. Positive and negative connections may be formed in either or both of the top surface 14 and bottom surface 18. Modular components may be connected to the top surface 14 and/or bottom surface 18 for charging power storage in those modular components or allowing the attached modular components to power connected devices. Power bank is a device that stores power in a Li-Ion battery. It is being increasingly used as reserve charger for handheld/portable devices like mobile phones, tablets etc. A typical power bank includes a charging circuit to implement the charging logic for a Lithium-Ion battery. A battery protection circuit to inhibit over charge and implement over temperature protections during charging and inhibit over discharge. A Boost Converter that steps up the incoming 3V-4.2V battery voltage to 5V. Also included are controller functions to monitor and control output voltage, measures battery voltage and monitors load current. and illuminates status LEDs to display battery level of other statuses.

A power adapter 50 such as an iWatt iW1691-03 Adapter having an AC input of 90-264 VAC and an output of 5V at 2.1 AMPs may be used. Any other suitable power adapter may be used. Leads 52, 54 connect power adaptor 50 to receptacle 24, 26 and blades 34, 36. Power adapter 50 is also connected to leads 54, 56, 58, 60 and 62 to power the connections, 30, 31 on the bottom wall 18. Leads 64, 66 power connections 30 on the top wall 14 and lead 68 powers connection port 72, into which tip 70 may be inserted. Any other low voltage connections formed in the front face, top wall, sidewalls, or bottom wall may be connected to power adapter 50.

The specifications for the iW1691-03 adapter are shown in Table 1 below:

TABLE 1

| Description | Symbol | Min | Typ | Max | Units |
|---|---|---|---|---|---|
| Input | | | | | |
| Voltage | $V_{IN}$ | 90 | | 264 | $V_{AC}$ |
| Frequency | $f_{LINE}$ | 47 | 50/60 | 63 | Hz |
| No-load input power (230 $V_{AC}$) | | | | 150 | mW |
| Output | | | | | |
| Output voltage | $V_{OUT}$ | 4.85 | | 5.25 | V |
| Output current | $I_{OUT}$ | 0 | | 2.1 | A |
| Output ripple voltage | $V_{RIPPLE}$ | | | 100 | $mV_{P\_P}$ |
| Total Output Power | | | | | |
| Continuous output power | $P_{OUT}$ | | 10.5 | | W |
| Over-current protection | $I_{OUT\ MAX}$ | | | 2.5 | A |
| Active mode protection | η | 80 | | | % |

While the power adapter chip 50 is preferably an adapter, any of a ground fault interrupter, a surge protector, a mechanical power interruption switch, or a WiFi extender may be included. The power supply may also be connected to a remote-control unit, thunderbolt, USB, Micro USB, HDMI, Ethernet connector formed in one of the walls. Generally power controllers include sensor ICs, cell controller ICs, and charger ICs that provide configuration flexibility with factory-programmable parameters such as output voltage and input over-voltage protection; Constant current (CC) and constant voltage (CV) charge modes; Trickle charge current and trickle charge voltage thresholds; EOC current and timeout; verification filter timing; and Recharge and thermal foldback thresholds. Other suitable controllers include the MC34671 and MC34674 single cell battery travel charger available from NXP Semiconductors. AC-DC Controllers which include Switched Mode Power Supply (SMPS) controllers, automatic discharge for low-power X capacitors, and Synchronous Rectifier (SR) controllers for switched mode power supplies with adaptive gate drive may also be preferred.

Figure 1F:
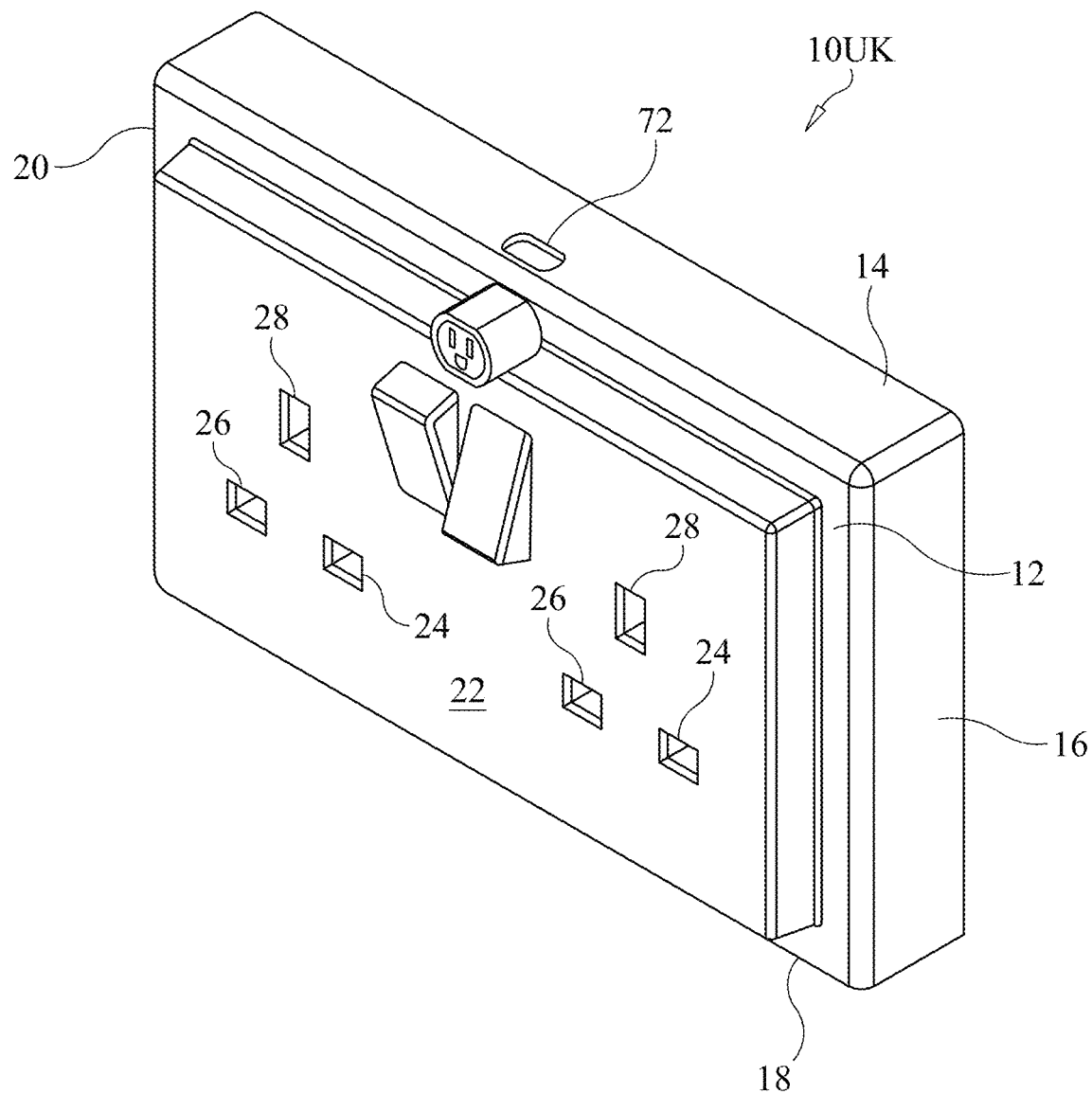
FIG. 1F is a perspective view of a wireless charger for use with a wall-mounted charging device and modular outlet extender in accordance with the present invention.

FIG. 1F shows a UK style wall-mounted charging device and modular outlet extender of the present invention in which the charging device 10UK includes a front face 12, a top wall 14, a right-side wall 16, a bottom wall 18, and a left side wall 20. Front face includes an outlet plate 22 that includes two outlets, each with a 240V AC "hot" receptacle 24, a neutral receptacle 26 and ground receptacle 28. In top wall, a receptacle 72 is formed for receiving any of a number of charging tips suitable for use with various electronic components. The 240V AC and receptacle configuration shown is typically suitable for use in the United Kingdom, it is within the scope of this invention to accommodate voltages and receptacle configurations for world-wide usage.

Figure 1G:
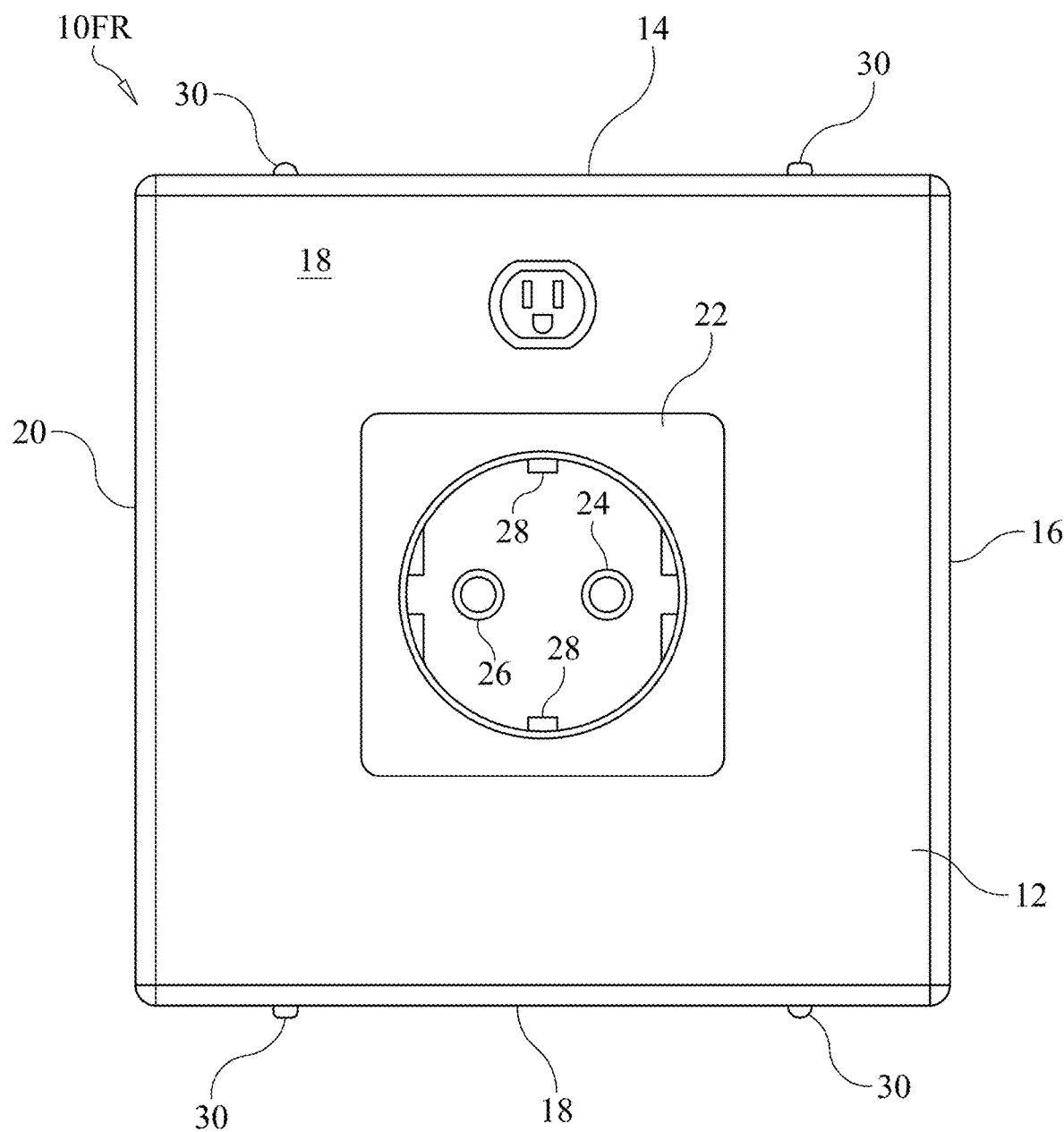
FIG. 1G is an elevation view of a wireless charger for use with a wall-mounted charging device and modular outlet extender in accordance with the present invention.

FIG. 1G shows a French/Belgium style wall-mounted charging device and modular outlet extender of the present invention in which the charging device 10FR includes a front face 12, a top wall 14, a right-side wall 16, a bottom wall 18, and a left side wall 20. Front face includes an outlet plate 22 that includes an outlet, each with a 230V AC "hot" receptacle 24, a neutral receptacle 26 and ground receptacle 28. In top wall, a receptacle (not shown) is formed for receiving any of a number of charging tips suitable for use with various electronic components. Top face 14 and bottom face 18 includes electrical connectors 30 and optionally universal type connectors (not shown). The 230V AC and receptacle configuration shown is typically suitable for use in France, it is within the scope of this invention to accommodate voltages and receptacle configurations for world-wide usage.

Figure 1H:
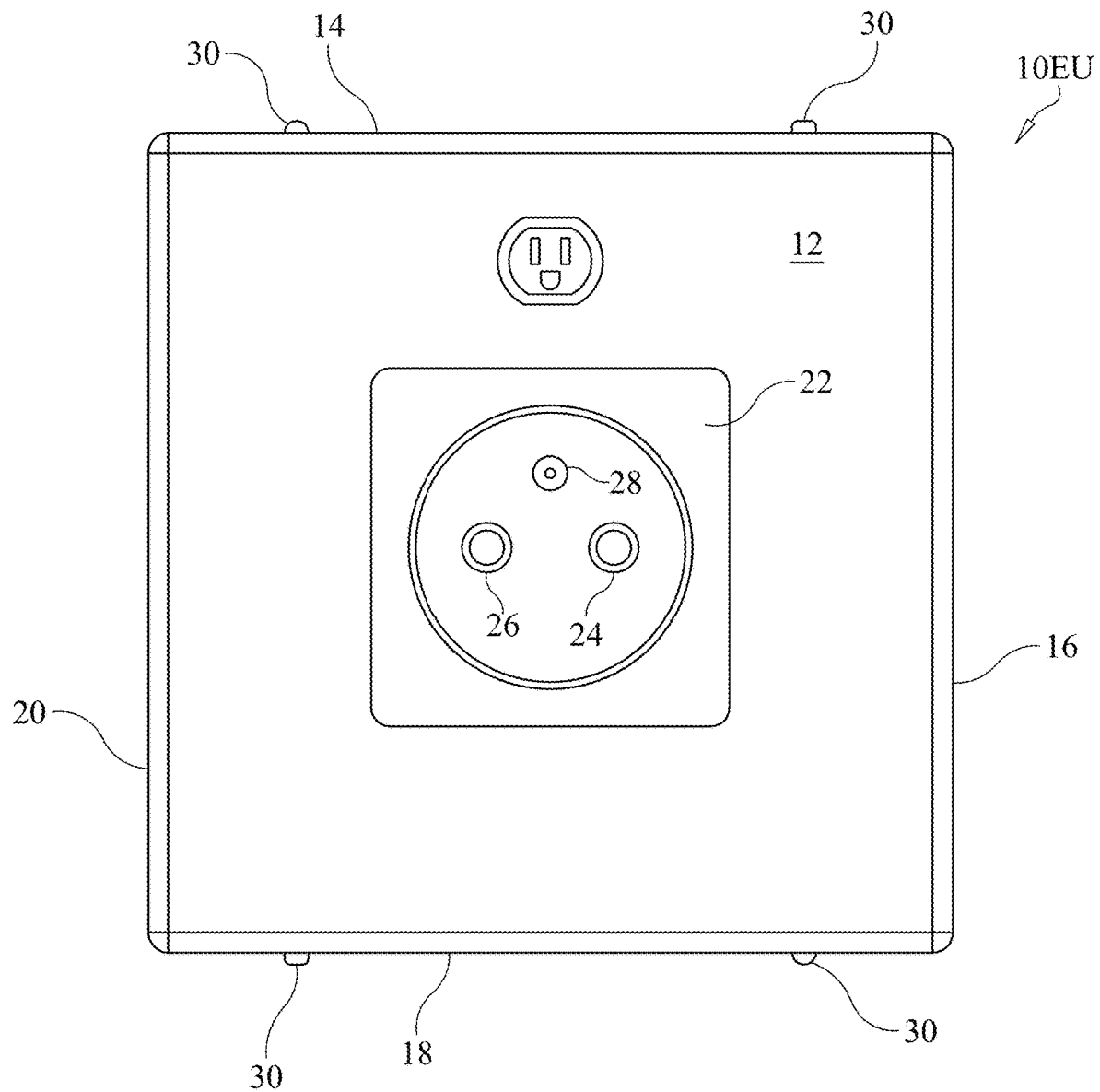
FIG. 1H is an elevation view of a wireless charger for use with a wall-mounted charging device and modular outlet extender in accordance with the present invention.

FIG. 1H shows a European Union style wall-mounted charging device and modular outlet extender of the present invention in which the charging device 10EU includes a front face 12, a top wall 14, a right-side wall 16, a bottom wall 18, and a left side wall 20. Front face includes an outlet plate 22 that includes an outlet, each with a 230V AC "hot" receptacle 24, a neutral receptacle 26 and ground receptacle 28. In top wall, a receptacle (not shown) is formed for receiving any of a number of charging tips suitable for use with various electronic components. Top surface 14 and bottom surface 18 include electrical connectors 30 and optionally universal type connectors (not shown). The 230V AC and receptacle configuration shown is typically suitable for use in many parts of the EU, it is within the scope of this invention to accommodate voltages and receptacle configurations for world-wide usage.

Figure 2A:
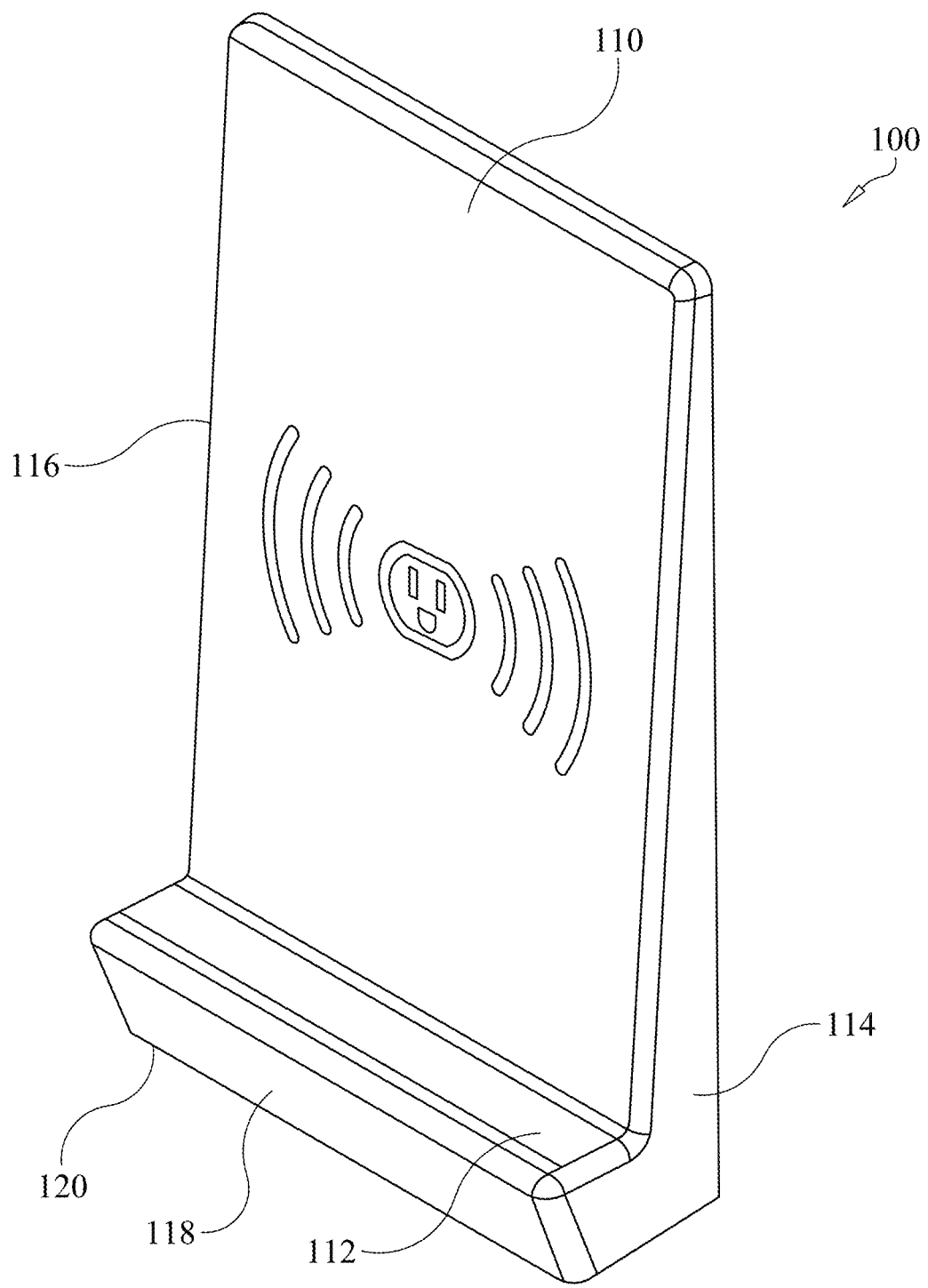
FIG. 2A is a perspective view of a wireless charger for use with a charging system in accordance with the present invention.

FIG. 2A shows a wireless electronic device charger 100, having a front face 110 which serves as a charging support, right wall 114, left wall 116, shelf 112 on cradle 118, and a low surface 120 including power inputs 130 (not shown). Wireless charger 100 includes a radio frequency output for charging an electrical device mounted on cradle 118 wirelessly. Wireless charger 100 rests on the top surface 14 of the charge base 10 and provides a shelf 112 for receiving an electronic device such that a wireless RF connection is made in order to charge the electronic device.

Figure 2B:
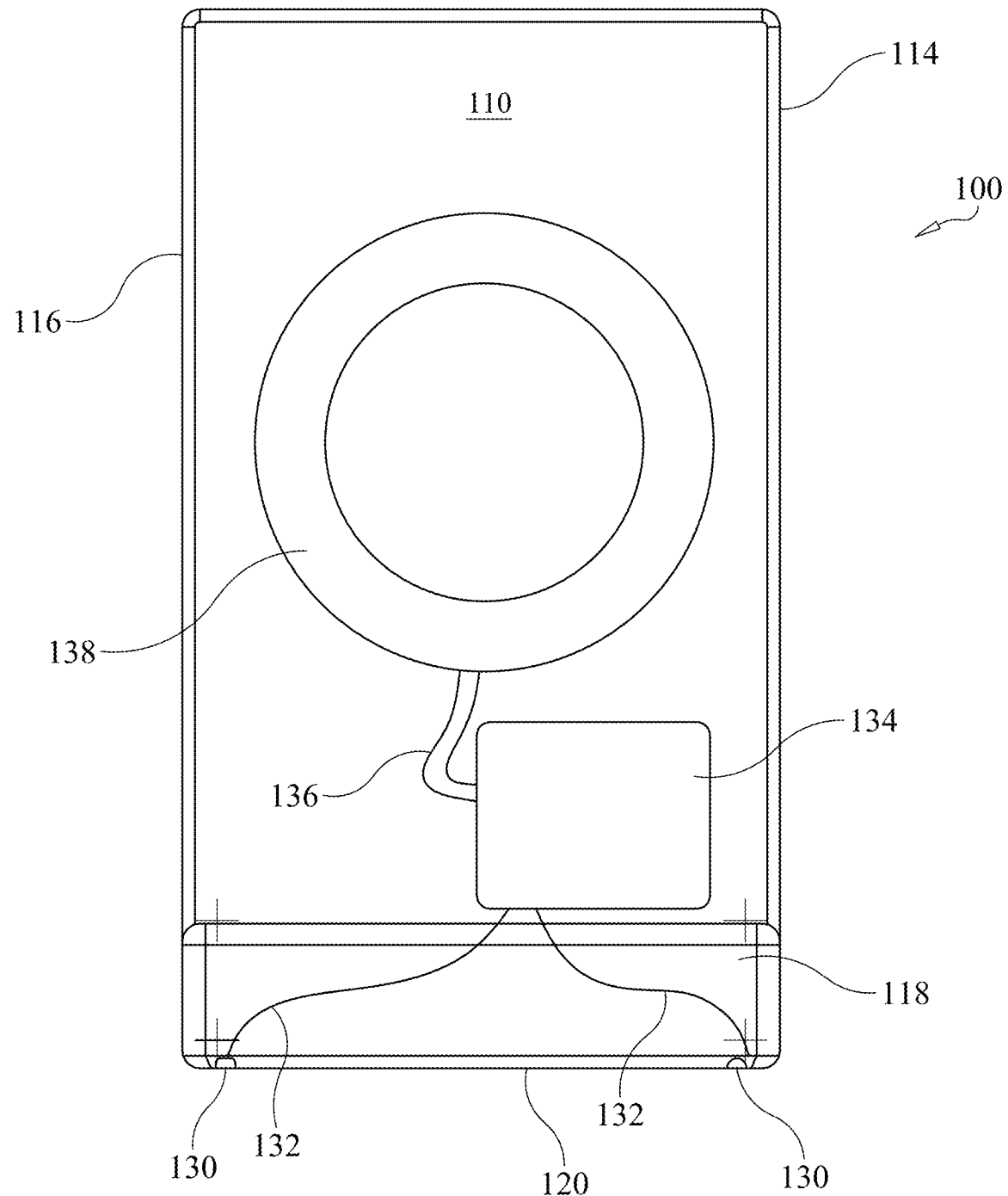
FIG. 2B is a schematic view of a wireless charger for use with a charging system in accordance with the present invention showing internal electronics.

FIG. 2B shows the circuitry within the wireless charger that converts the low voltage input from the base unit to an RF signal. The wireless electronic device charger 100, having a front face 110, right wall 114, left wall 116, shelf 112 on cradle 118, and a low surface 120 including indent type power inputs 130. Wireless charger 100 includes a radio frequency output 138 for charging an electrical device mounted on cradle 118 wirelessly. The wireless charger may be connected to another component of the system of the present invention such to a battery block charging device 200, the wall charger 10, the car charger 300 or the wearable charger 400 by electrical connections 130 formed in the base wall 120. Leads 132 link electrical connections 130 to power adapter 134 to power the wireless coils. One suitable wireless system is known as the Qi standard for low power inductive transfers to deliver power below 5 W using inductive coupling between two planar coils. Leads connect power adaptor to electrodes on a surface of the battery. The wireless charging transmitter is typically powered by an input DC rail of 5 V to 19 V, from a USB port or an AC/DC power adapter. The transmitter has a coil to transfer power by electromagnetic induction. Some transmitters support multi-coil arrays, driven by separate bridges which are automatically selected to deliver the highest coupled power into the wireless power receiver. The induced power is coupled to the wireless power receiver, which has a similar coil to collect the incoming power. The receiver rectifies the power by means of diode rectifiers, usually made of FETs for improving the efficiency. It also filters the power using ceramic output capacitors, and then applies it to the battery that needs to be charged, either through a linear stage or a switching regulator. The battery inside the portable device receives the power and charges up. The receiver can command the transmitter to adjust the charging current or voltage, and to stop transmitting power completely when end of charge is indicated. The electrodes are linked to a circuit board that converts the low voltage current input to an RF output. The RF signal charges the electronic device. The power controller 134 may also include power management features to monitor the battery during the charging process to cut off the RF signal when the battery is at full charge.

Figure 2C:
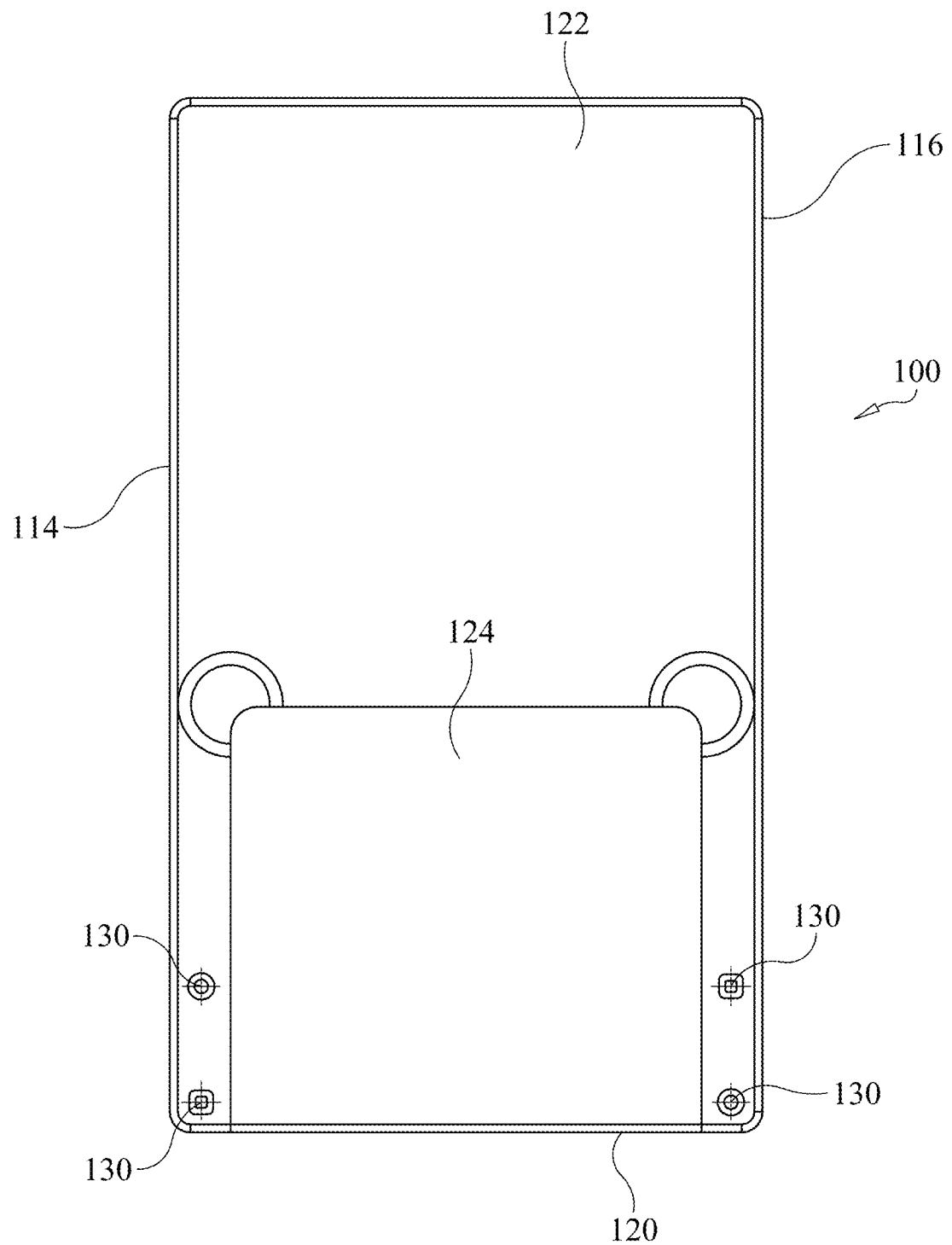
FIG. 2C is a rear elevation view of a wireless charger for use with a charging system in accordance with the present invention.

FIG. 2C shows the rear face 122 of wireless charger 100. The wireless electronic device charger 100, having a front face 110 (not shown), right wall 114, left wall 116, shelf 112 (not shown) on cradle 118 (not shown), and a lower surface 120 including indent type power inputs 130. Hinged support 124 may be included to allow charger 100 to stand independently. The wireless charger 100 may be connected to another component of the system of the present invention such as a battery block charging device 200. Wireless electronic device charger 100 may typically be a universal receiver of power so that it includes indent type power inputs 130 on the lower surface 120 and rear surface 122.

Figure 2D:
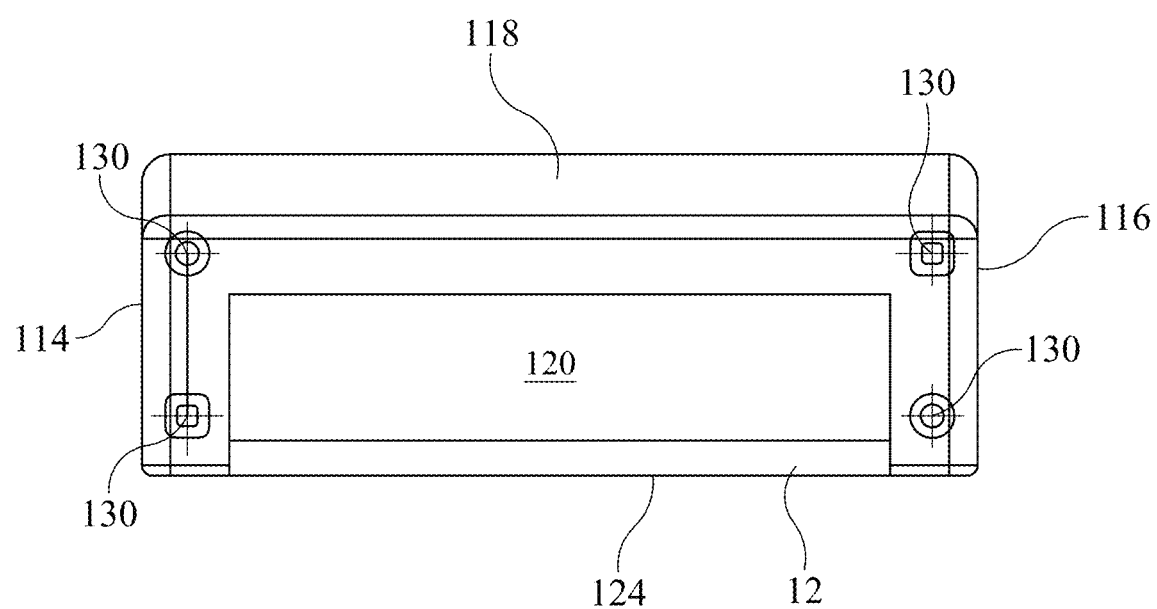
FIG. 2D is a bottom plan view of a wireless charger for use with a charging system in accordance with the present invention.

FIG. 2D shows the bottom wall 122 of wireless charger 100. The wireless electronic device charger 100, having a front face 110 (not shown), right wall 114, left wall 116, shelf 112 on cradle 118 (not shown), and a lower surface 120 including indent type power inputs 130. Hinged support 124 may be included to allow charger 100 to stand independently. The wireless charger 100 may be connected to another component of the system of the present invention such as a battery block charging device 200.

Figure 2E:
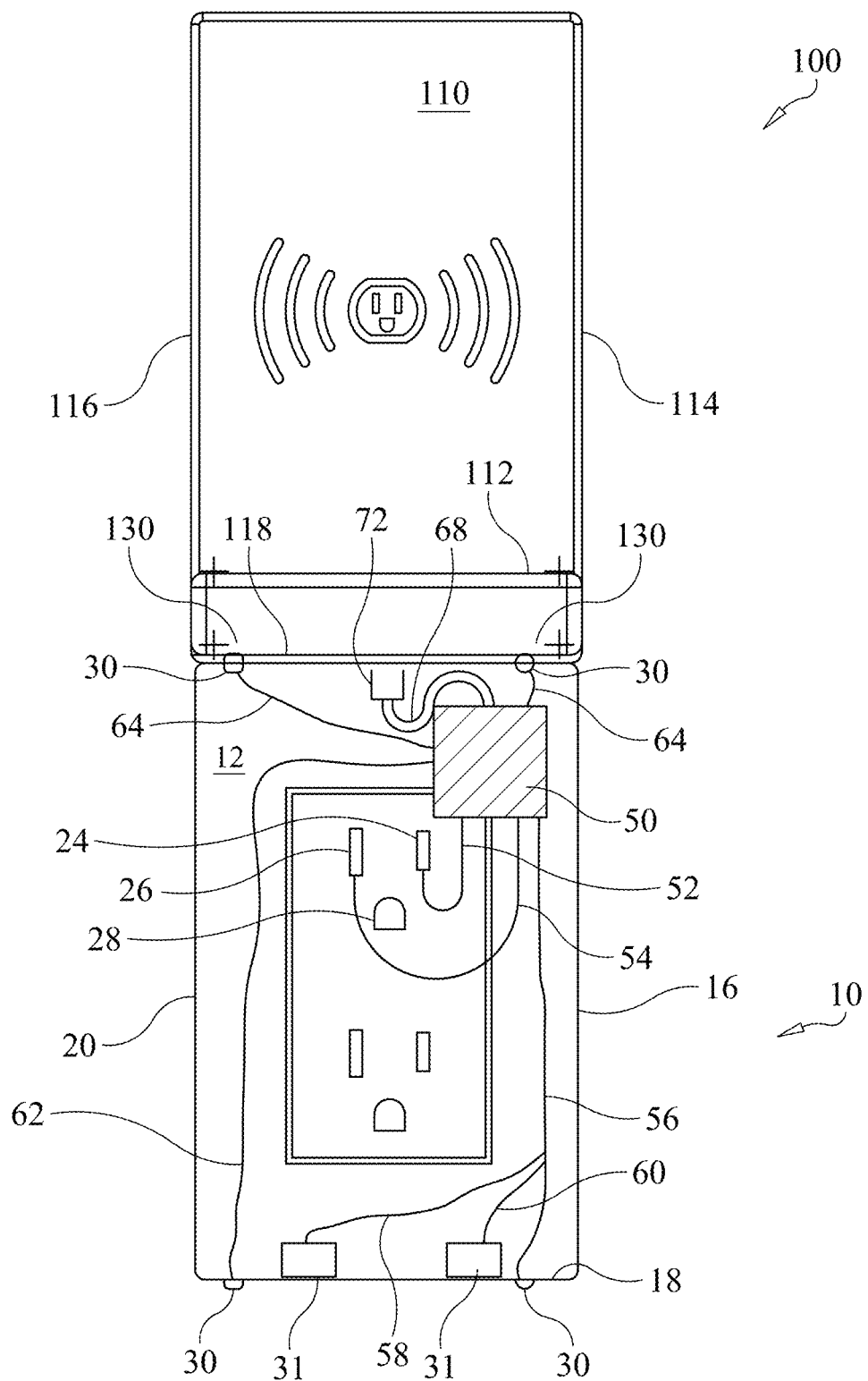
FIG. 2E is a front elevation view and partial schematic of a wireless charger in use with a wall mounted charging device in accordance with the present invention.

FIG. 2E shows a wireless electronic device charger 100 mounted on a wall charger 10 in accordance with the present invention. The wireless charger 100 includes front face 110, right wall 114, left wall 116, shelf 112 on cradle 118, and a low surface 120 including power inputs 130. Wireless charger 100 is shown on top surface 14 of the charge base 10 and provides a shelf 112 for receiving an electronic device such that a wireless RF connection is made in order to charge the electronic device. The charging device 10 includes a front face 12, a top wall 14, a right-side wall 16, a bottom wall 18, and a left side wall 20. Front face 12 includes an outlet plate that includes two outlets 22, each with a 120V AC "hot" receptacle 24, a neutral receptacle 26 and ground receptacle 28. In top wall 14, a receptacle (not shown) is formed for receiving any of a number of charging tips suitable for use with various electronic components. It is also possible to omit the power manager 134 in wireless charger 100 by selection of a power adapter 50 in wall charger 10 that is suitable for use with the wireless antenna under the Qi standard or any other wireless system. Extension type electrical connections 30 of base charging unit 10 mate with indent type electrical connections 130 on electronic device charger 100.

Figure 2F:
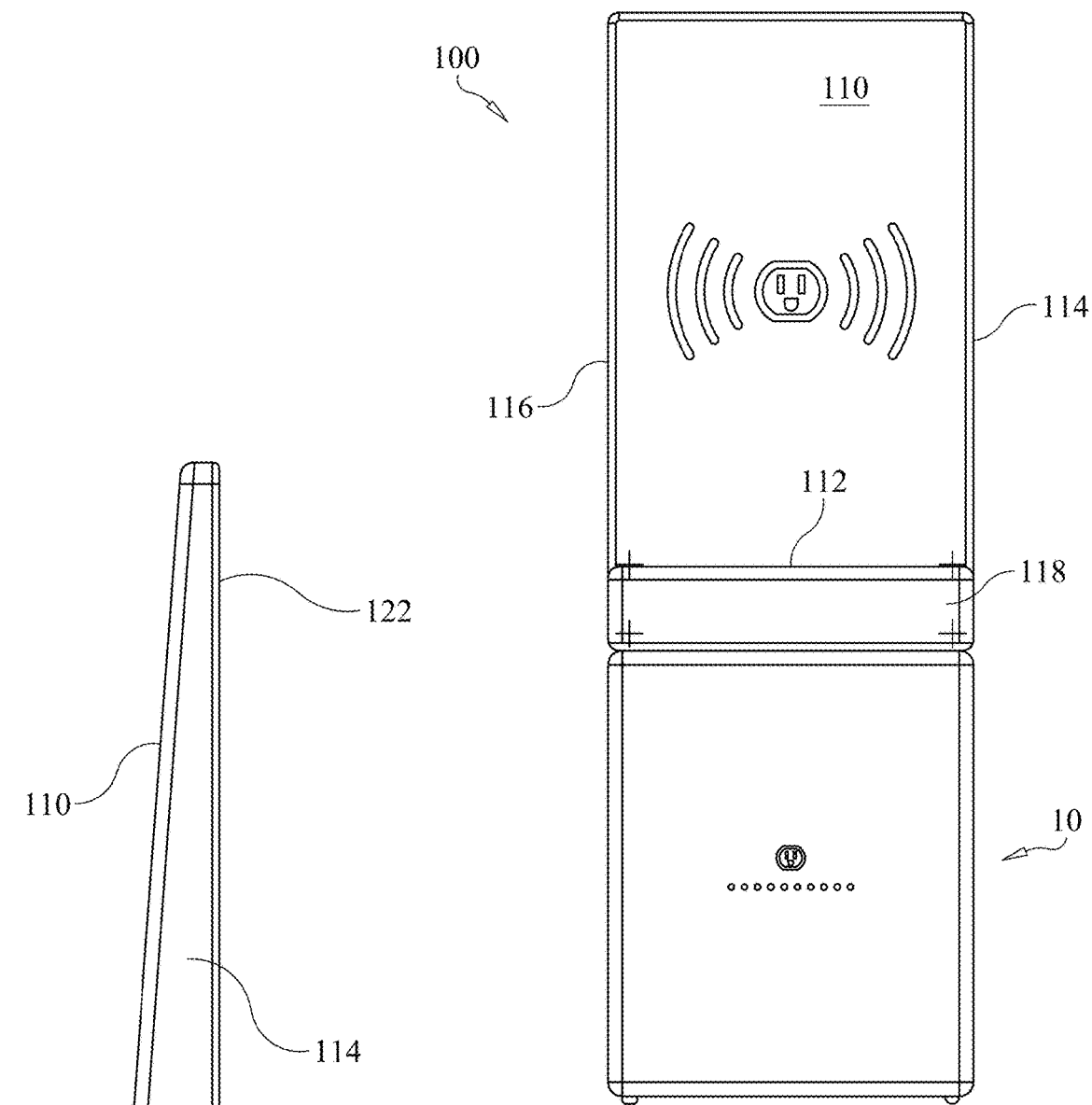
FIG. 2F is a front elevation view of a wireless charger on a battery block charging device in accordance with the present invention.

FIG. 2F shows a wireless electronic device charger 100 mounted on a battery block 200 in accordance with the present invention. The wireless charger 100 includes front face 110, right wall 114, left wall 116, shelf 112 on cradle 118, and a lower surface 120 (not shown) including indent type power inputs 130. Wireless charger 100 is shown linked to the top surface battery block 200 as disclosed hereinbelow. Wireless charger 100 provides a shelf 112 for receiving an electronic device such that a wireless RF connection is made in order to charge the electronic device.

Figure 2G:
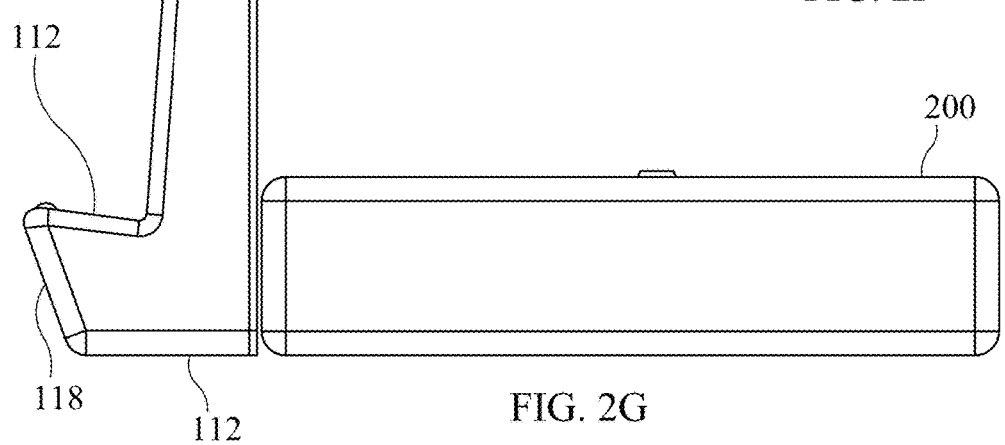
FIG. 2G is a side elevation view of a wireless charger in a self-supporting use with a battery block charging device in accordance with the present invention.

FIG. 2G shows a wireless electronic device charger 100 mounted on a battery block 200 in accordance with the present invention. The wireless charger 100 includes front face 110, right wall 114, left wall 116 (not shown), shelf 112 on cradle 118, lower surface 120 and rear wall 122 including indent type power inputs 130 (as shown in FIG. 2C). Wireless charger 100 is shown linked to the top surface battery block 200 as disclosed hereinbelow. Linking the rear face 122 of wireless charger 100 to battery block 200 provides a free-standing charger 100.

Figure 2H:
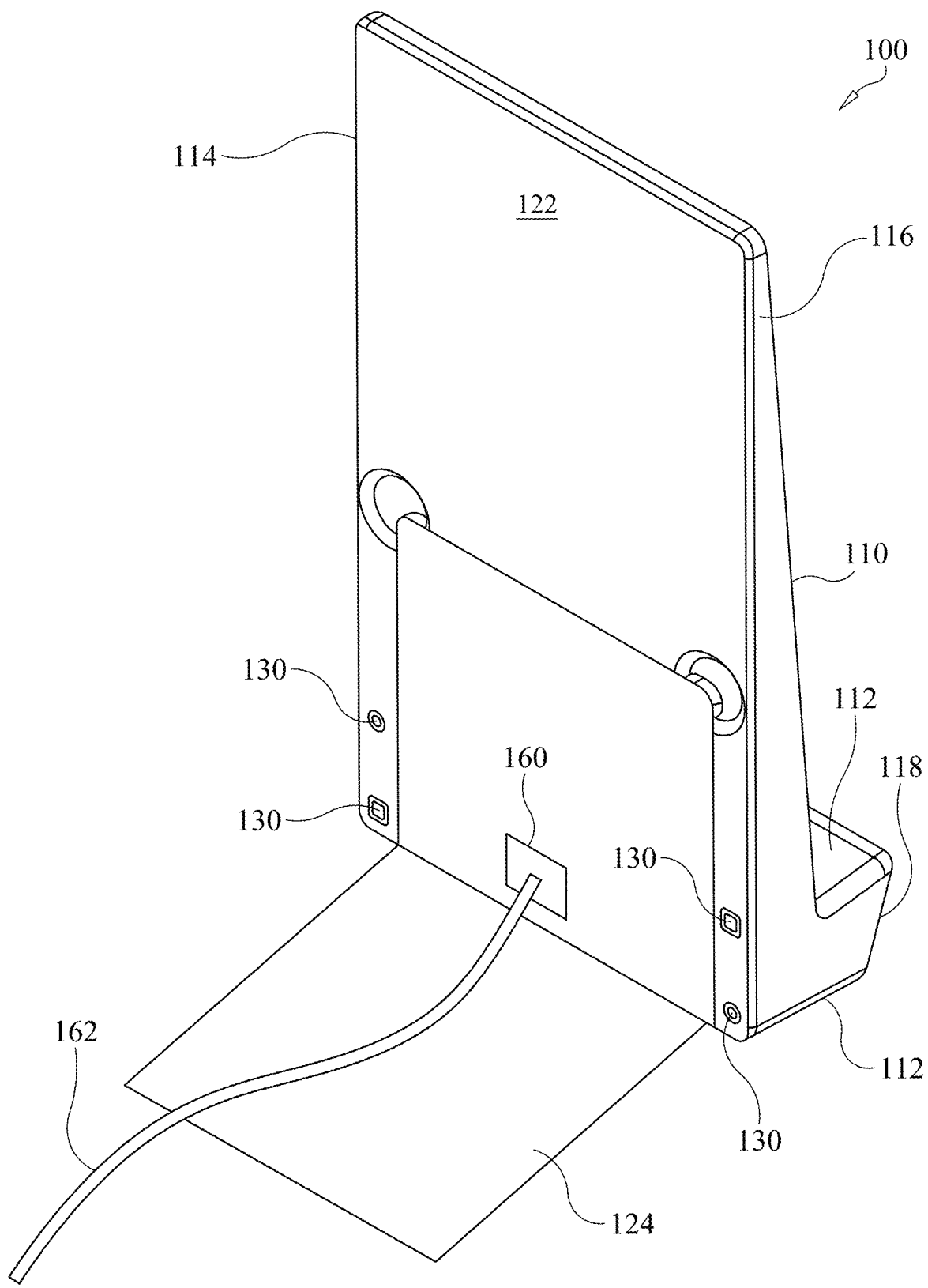
FIG. 2H is a rear perspective view of a wireless charger with a rear support deployed and a charge cable attached to a wireless charger in accordance with the present invention.

FIG. 2H shows a wireless electronic device charger 100 connected to a power supply 162 such as USB cable. The wireless charger 100 includes front face 110, right wall 114, left wall 116 (not shown), shelf 112 on cradle 118, lower surface 120 and rear wall 122 including indent type power inputs 130. Lowering support 124 from rear face 122 of wireless charger 100 exposes a connection, such as a USB port, and provides a free-standing wireless charger 100 having a constant power source via cable 162.

Figure 3A:
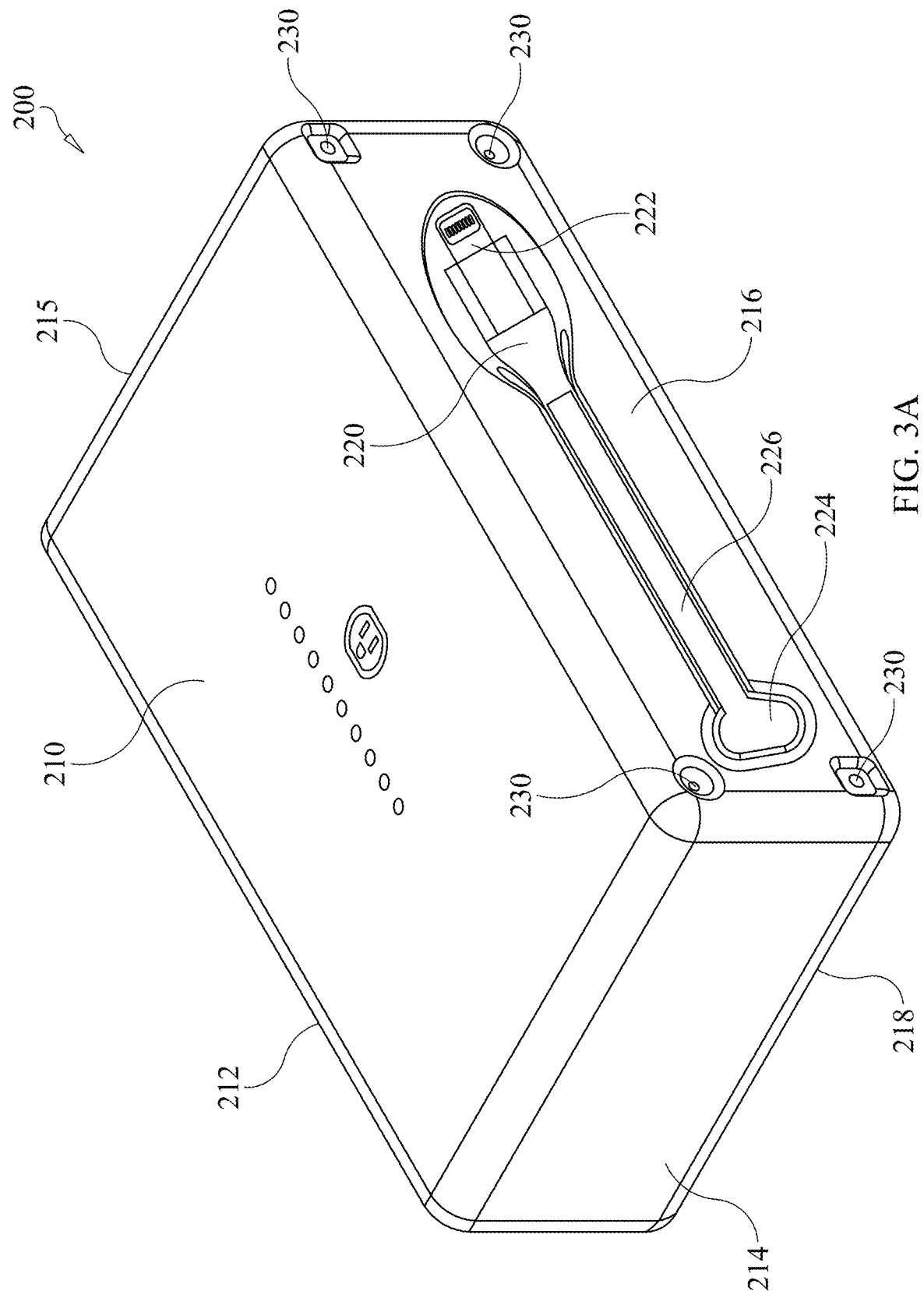
FIG. 3A is a lower perspective view of an accessory battery pack suitable for use with a modular charging system in accordance with the present invention.

FIG. 3A shows a stackable battery block, power component 200 that may be attached to a wall mounted charger and other associated components. The battery block 200 is suitable for charging electronic components such as phones, tablets, readers, and other low voltage devices via flexible cable 220. Battery block 200 includes a housing having front wall 210, top wall 212, left wall 214, right wall 215, rear wall 218 and bottom wall 216 with indent type power inputs 230 on bottom wall 216. At least one connector cable 220 may be included within battery block 200. Cable 220 may either be permanently connected to the battery block 200 or connected via a serial port (not shown). Cable 220 is preferable installed in a recess 220 formed in the battery block 200.

Figure 3B:
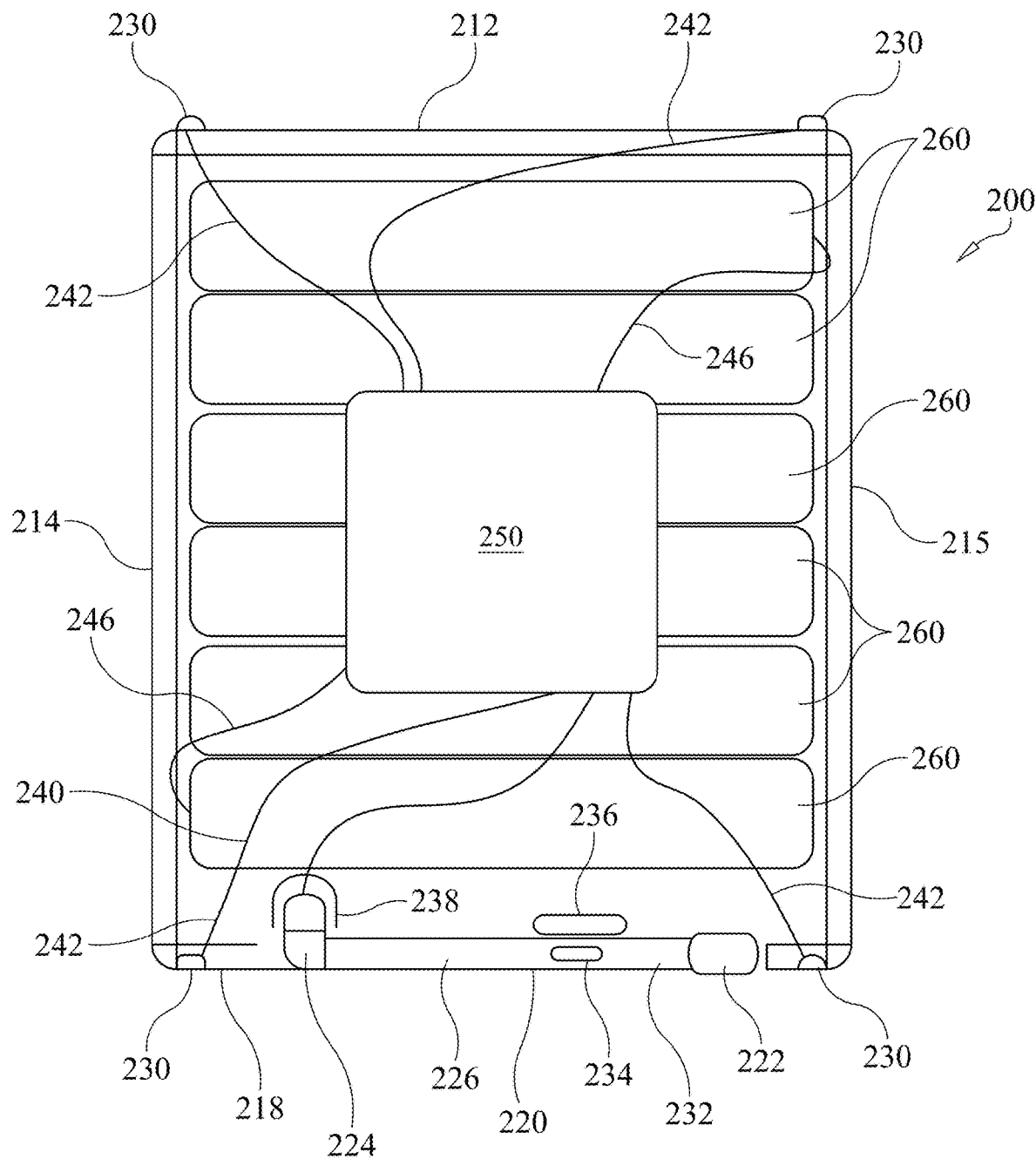
FIG. 3B is a front schematic view of an accessory battery pack showing the internal electronics suitable for use with a modular charging system in accordance with the present invention.

FIG. 3B shows a schematic of a battery block, power component 200 useful with the associated components of the present invention. Battery block 200 includes front wall 210, top wall 212, left wall 214, right wall 215, rear wall 218 and bottom wall 216. At least one connector cable 220 may be included within battery block 200. A number of linked battery cells 260 are included within battery block 200. Cells 260 may be linked in series or parallel, or in a combination of serial and parallel to provide the desired output. Integrated circuit power managers 250 are designed for various cell combinations and may monitor each cell individually and the output of the linked cells. The US Federal Aviation Administration limits carryon battery power blocks 200 to a capacity of 27,000 mAh, which is generally considered an upper limit for broad acceptance, however larger battery blocks 200 may be made and sold for use not limited by the FAA regulations. Battery leads 246 link the positive and negative terminals of the power pack and provide power input to controller 250 and information to monitor the power output and remaining charge in cells 260. Leads 242 transfer power to extension type electrical connectors 230 and from indent type power inputs 230. Another set of leads 240 provide power to cable 220 via serial port 238. As shown, cable 220 may include a central shaft 226 having a distal end 224 having a serial connection 224 such as a USB-C connector on the proximal end. Distal end 224 is placed in power component 200 such that serial connection 237 is mated to a bus 238. A separate connector 222 at the distal end 232, such as a USB or Apple® Lightening connector. Cable 200 may also include a permanent magnet 234 which is attracted to permanent magnet 236 mounded within battery block 200 to releasably retain distal end 232 within recess 220. Battery block 200 is suitable for charging electronic components such as phones, tablets, readers, and other low voltage devices via flexible cable 220. Separate cables may be used so that block 200 may charge devices having different power inputs.

Figure 3C:
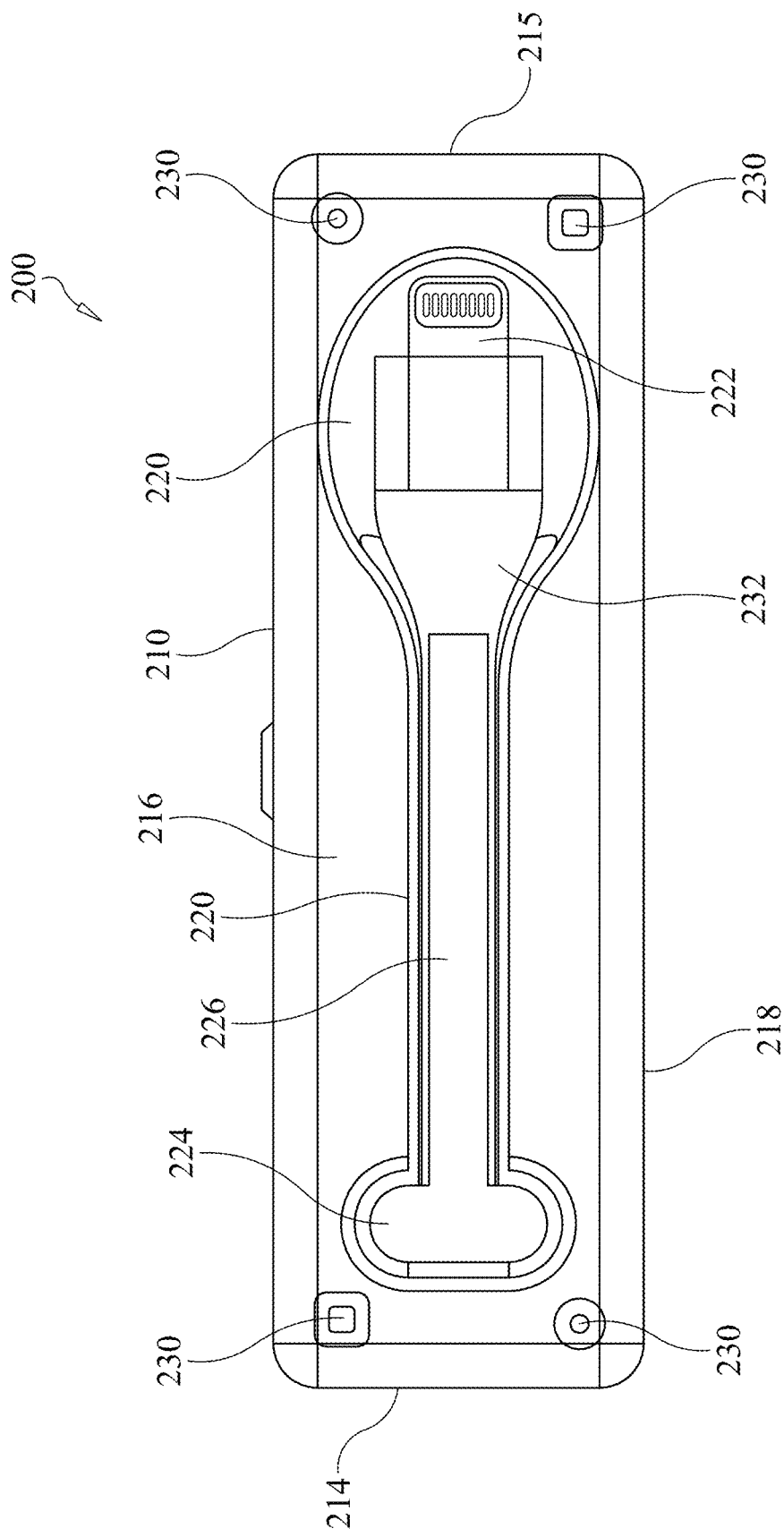
FIG. 3C is a bottom plan view of an accessory battery pack suitable for use with a modular charging system in accordance with the present invention.

FIG. 3C shows a schematic of a battery block, power component 200 useful with the associated components of the present invention. Battery block 200 includes front wall 210, top wall 212, left wall 214, right wall 215, rear wall 218 and bottom wall 216. At least one connector cable 220 may be included within battery block 200. Indent type electrical connectors 230 may be used to link block 200 to other components in the modular charging system of the present invention. As shown, cable 220 may include a central shaft 226 having a serial connection 238, such as a USB-C connector on the proximal end and a separate connector 222 at the distal end 232, such as a USB or Apple® Lightening connector. Cable 200 may also include a permanent magnet 234 which is attracted to permanent magnet 236 mounded within battery block 200 to releasably retain distal end 232 within recess 220. Battery block 200 is suitable for charging electronic components such as phones, tablets, readers, and other low voltage devices via flexible cable 220. Separate cables may be used so that block 200 may charge devices having different power inputs.

Figure 3D:
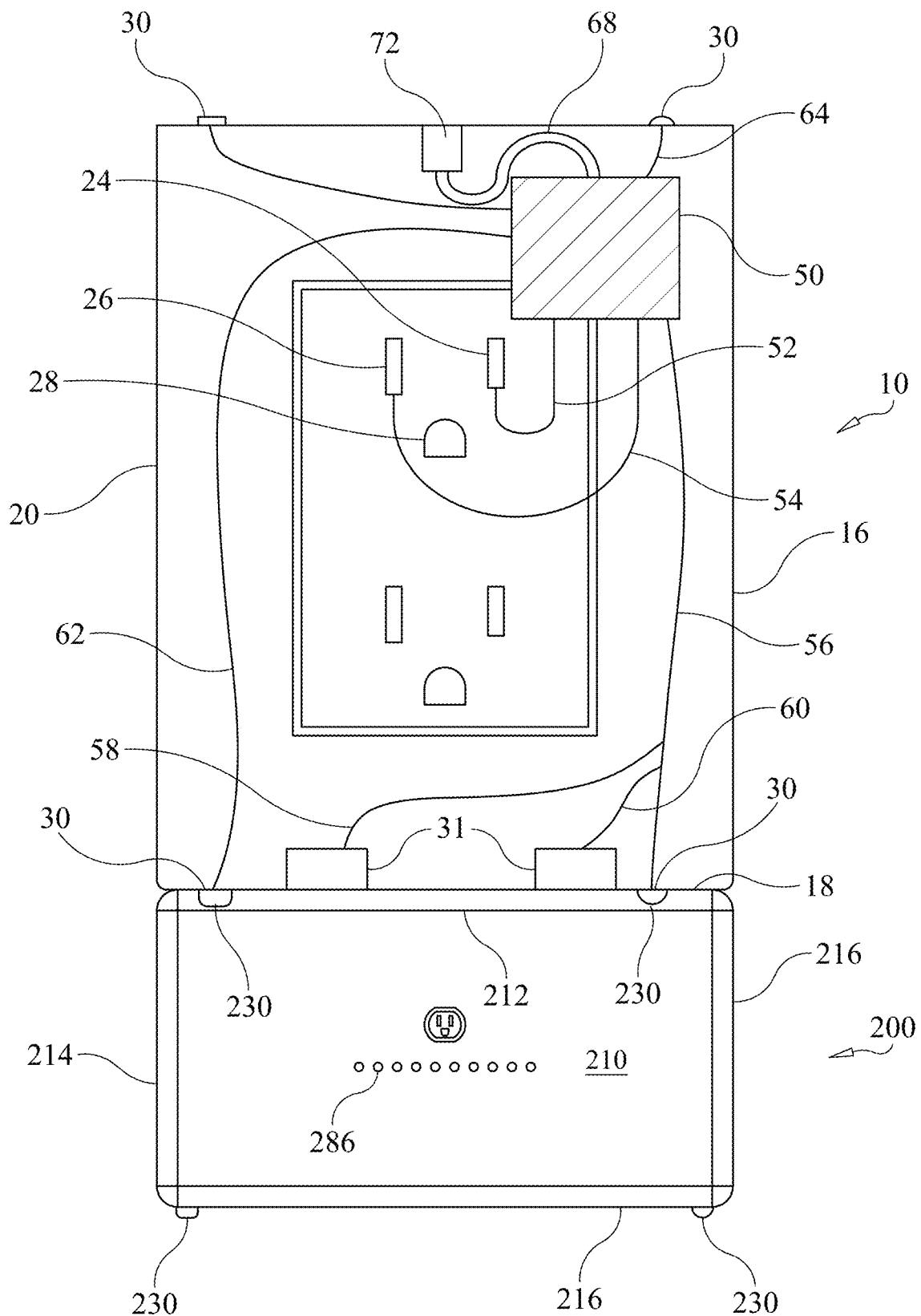
FIG. 3D is a bottom plan view and partial schematic of an accessory battery pack suitable for use with a modular charging system in accordance with the present invention.

FIG. 3D shows a battery block 200 mounted on a wall charger 10 in accordance with the present invention. The battery block 200 includes front face 210, right wall 216, left wall 214, top wall 212 including indent type power inputs 230, and a bottom surface 216 including extension type electrical connections 230. Battery block 200 is shown on bottom wall 18 of the charge base 10 The charging device 10 includes a front face 12, a top wall 14, a right-side wall 16, a bottom wall 18, and a left side wall 20. Front face 12 includes an outlet plate that includes two outlets 22, each with a 120V AC "hot" receptacle 24, a neutral receptacle 26 and ground receptacle 28. The connections may be magnetized for secure connection to a charging base or the housing may include magnets for providing the connection. In the event that the connector pins are magnetic it may be useful to have an electronically conducting coating on the pins rather than relying on the magnetic material as the conductor. A charge indicator, such as: LEDs or LCDs may be included in the housing to indicate that a connection is made with a charging base or the status of the charge in the stackable power device. The housing of the battery block 200 includes corresponding magnets so that the power device may be removably but securely connected to the charging device. Leads 52, 54 connect power adaptor 50 to receptacle 24, 26 and blades 34, 36. Power adapter 50 is also connected to leads 54, 56, 58, 60 and 62 to power the connections, 30, 31 on the bottom wall 18. Leads 64, 66 power extension type electrical connections 30 on the top wall 14 and lead 68 powers connection port 72, into which tip 70 may be inserted. Any other low voltage connections formed in the front face, top wall, sidewalls, or bottom wall may be connected to power adapter 50. Indent type power connections 230 in battery block 200 connect to extension type power connections 30 in the wall charger 10 to charge the cells within the battery block 200. Battery block 200 may include a permanent magnet in the housing 200 or each connection 230 may be magnetized to provide a sturdy, but easily removable connection.

Figure 3E:
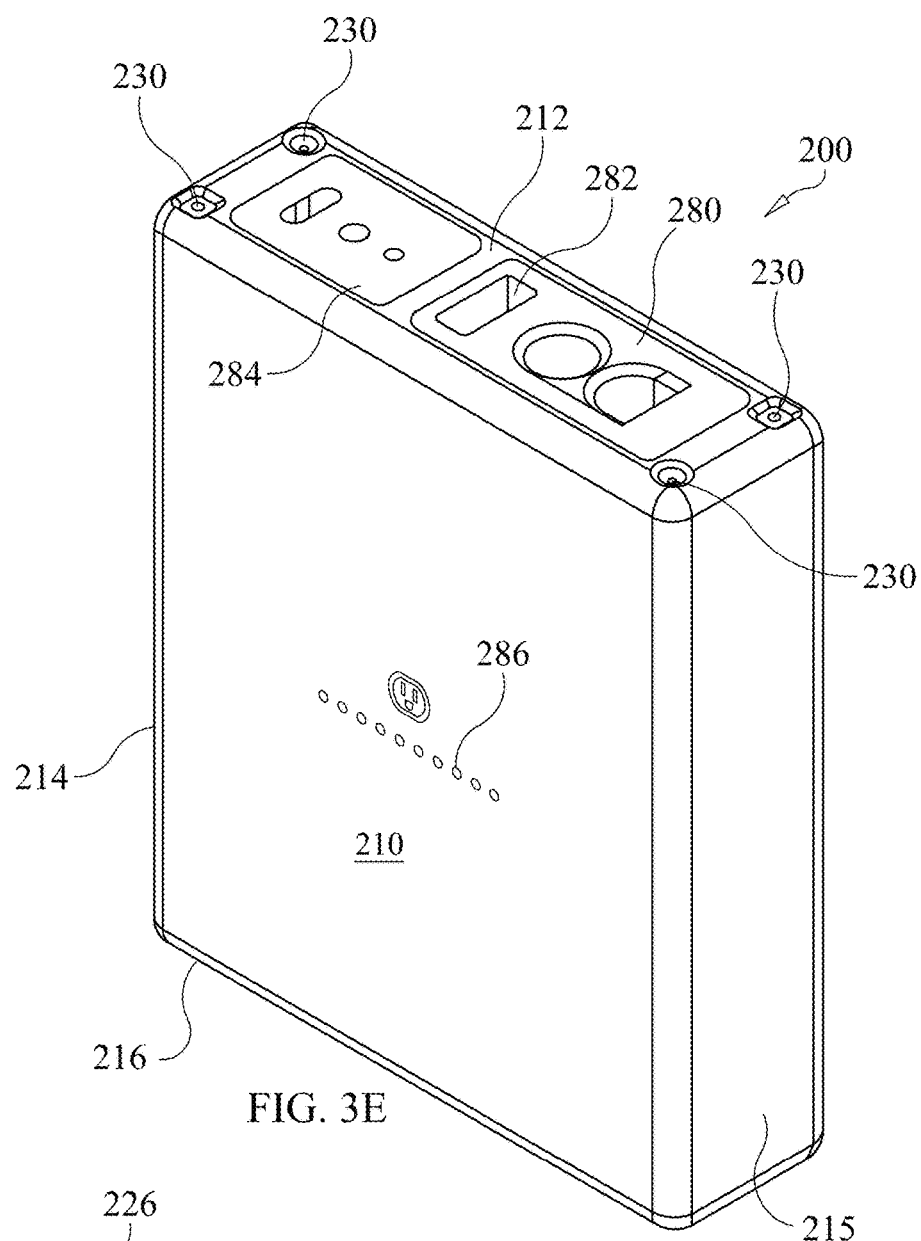
FIG. 3E is a lower perspective view of an accessory battery pack suitable for use with a modular charging system in accordance with the present invention.

FIG. 3E shows a stackable battery block, power component 200 that may be attached to a wall mounted charger and other associated components. The battery block 200 is suitable for charging electronic components such as phones, tablets, readers, and other low voltage devices. Battery block 200 includes a housing having front wall 210, top wall 212, left wall 214, right wall 215, rear wall 218 and bottom wall 216 with indent type electrical connections 230 therein. Any number of outputs may be included in top wall 212, a 12V output 280, suitable for connection to jumper cables to start a motor vehicle, a USB-A 282, and USB-C 284 connections are also shown. LED or LCD power monitor lights 286.

Figure 3F:
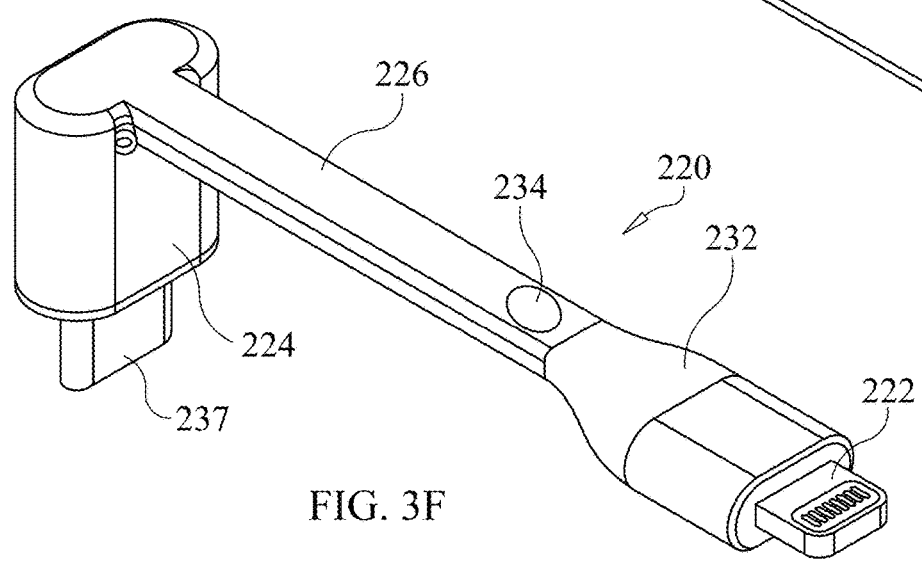
FIG. 3F is an upper perspective view of a connection cable suitable for use with accessories in accordance with the present invention.

FIG. 3F shows one form of cable 220 that may include a central shaft 226 having a distal end 224 having a serial connection 224 such as a USB-C connector on the proximal end. Distal end 224 is placed in a power component 200 such that serial connection 237 is mated to a bus 238. A connector 222 such as a USB or Apple® Lightening connector is positioned at the distal end 232 of cable 200. Cable 200 may also include a permanent magnet 234 which is attracted to permanent magnet 236 mounded within battery block 200 to releasably retain distal end 232 within recess 220 of any of devices shown.

Figure 4A:
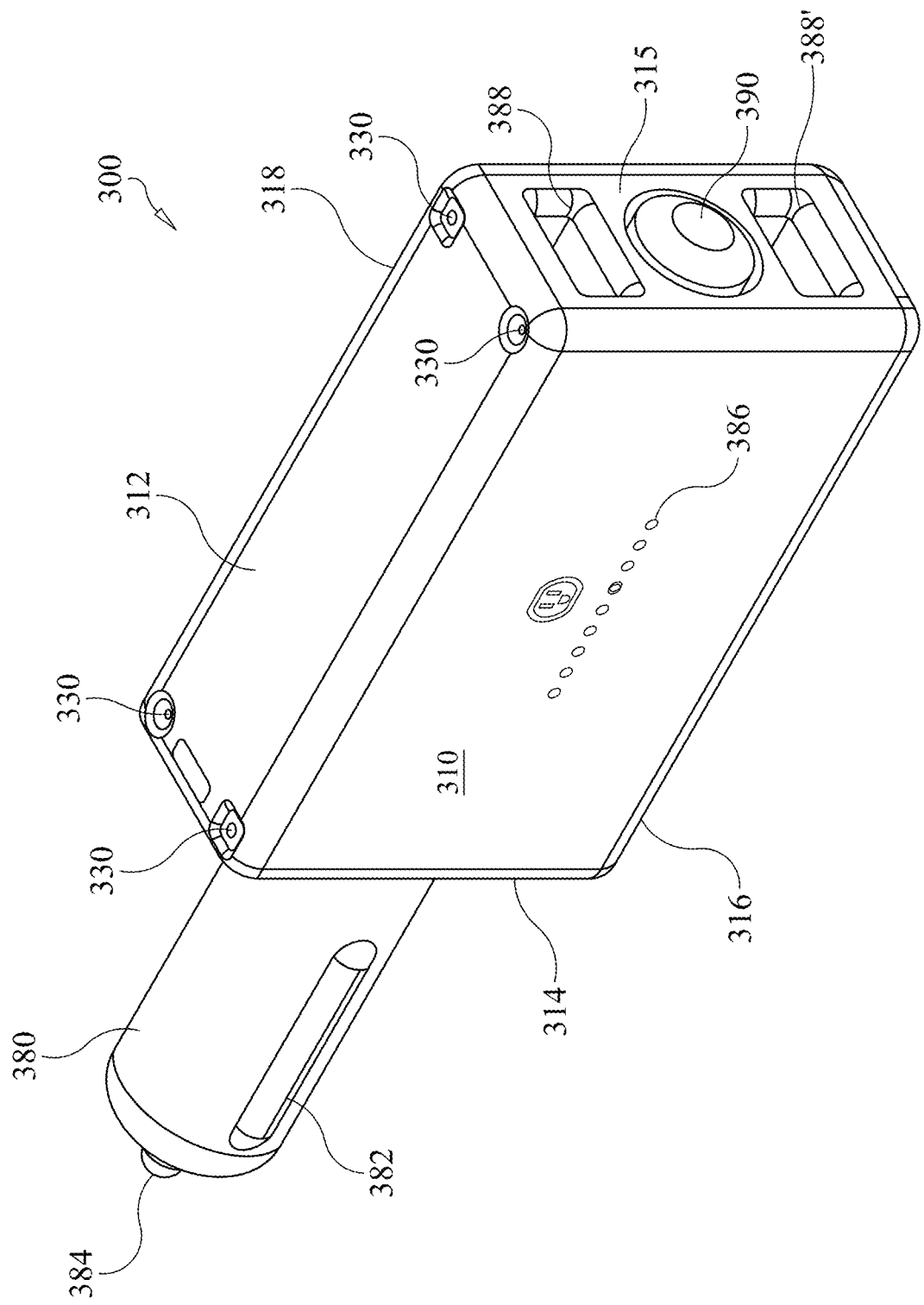
FIG. 4A is a perspective view of an accessory car charger suitable for use with a modular charging system in accordance with the present invention.

FIG. 4A shows a portable car charger, power component 300 for use in a vehicle 12V charger. Car charger 300 is suitable for charging electronic components such as phones, tablets, readers, and other low voltage devices. Car charger, power component 300 includes a battery storage so a device such as a cell phone may be charged when the vehicle is immobile on the side of the road with a failed electrical system. Car charger 300 includes a housing having front wall 310, top wall 312, left wall 314, right wall 315, rear wall 318 and bottom wall 316. Indent type electrical connections 330 are shown in top wall 312. The electrical connections 330 may have circular and square cross sections as shown. A barrel 380 extends from left wall 314 for insertion into a vehicle 12V charge port. Contacts 382, 384 extend from barrel 380 to make an electrical connection with the vehicle 12V port. Charge monitor indicators 386 such as LED or LCDs. Power outputs 388, such as USB-A or USB-C and a LED flashlight may be included on the left wall 315.

Figure 4B:
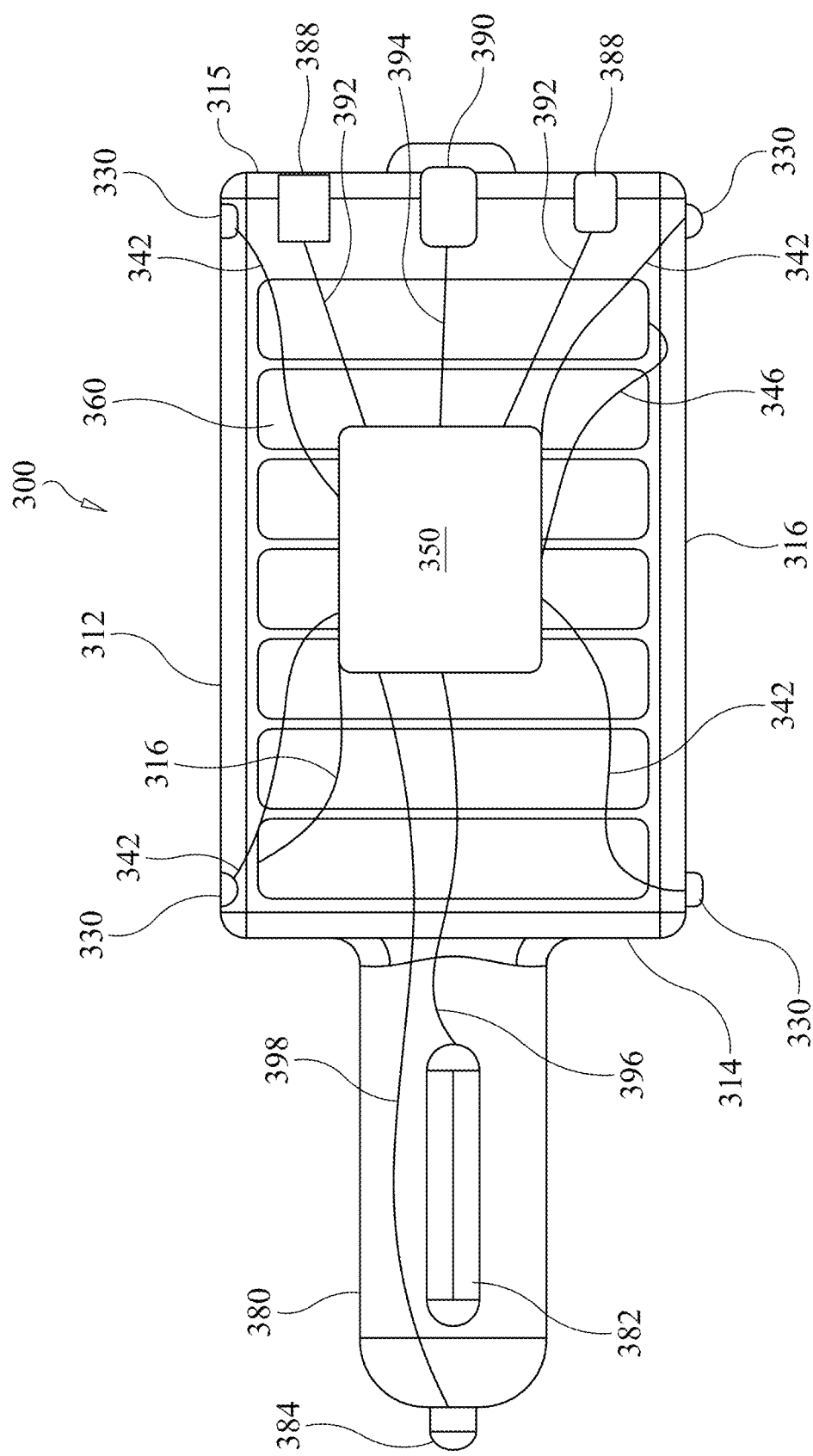
FIG. 4B is a side schematic view of an accessory car charger suitable for use with a modular charging system in accordance with the present invention.

FIG. 4B shows a schematic of a car charger, power component 300 useful with the associated components of the present invention. Car charger, power component 300 includes top wall 312, left wall 314, right wall 315, rear wall 318 (not shown) and bottom wall 316. A number of linked battery cells 360 are included within car charger, power component 300. Cells 360 may be linked in series or parallel, or in a combination of serial and parallel to provide the desired output. Integrated circuit power managers 350 are designed for various cell combinations and may monitor each cell individually and the output of the linked cells. Battery leads 346 link the positive and negative terminals of the power pack and provide power input to controller 350 and information to monitor the power output and remaining charge in cells 360. Leads 342 provide power to indent type electrical connections 330, shown in top wall 312 and extension type electrical connections 330, shown in bottom wall 316. Leads 392 provide power to bus connections 392 and lead 394 connects power manager 350 to LED flashlight 390. Barrel contacts 382, 384 are linked to power controller 350 via leads 396, 398 to make the electrical connection with the vehicle 12V port.

Figure 4C:
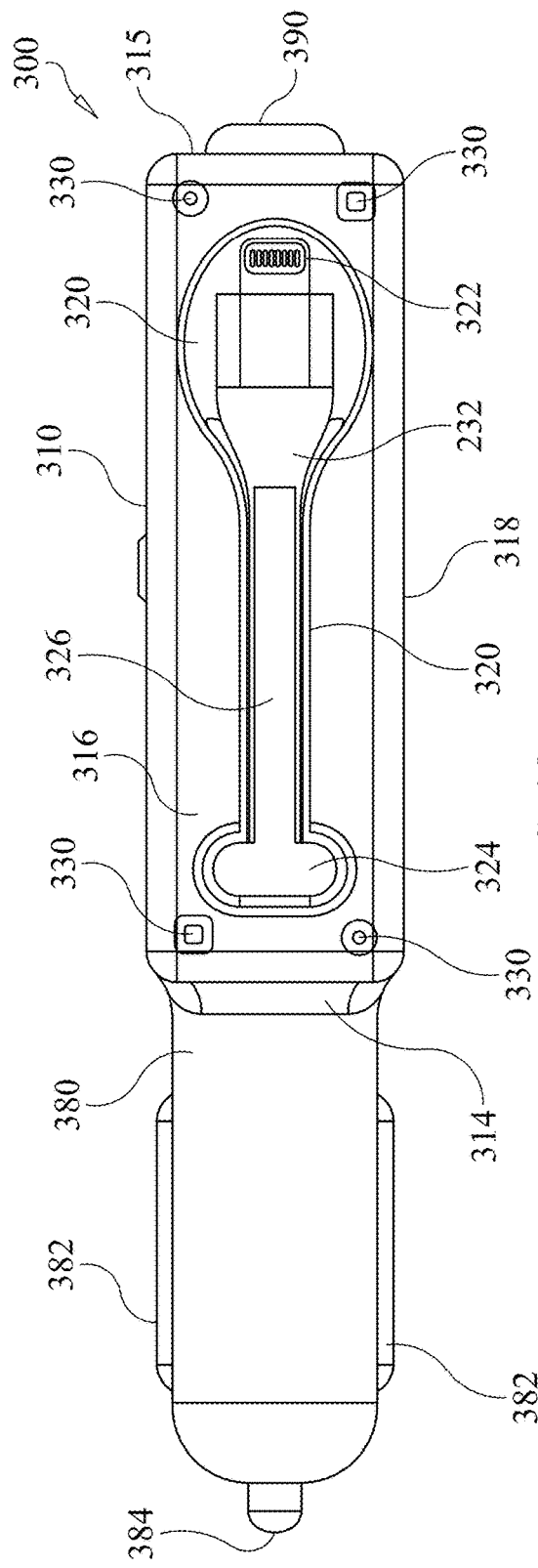
FIG. 4C is a bottom plan view of an accessory car charger suitable for use with a modular charging system in accordance with the present invention.

FIG. 4C shows a schematic of a car charger, power component 300 useful with the associated components of the present invention. Car charger, power component 300 includes front wall 310, top wall 312 (not shown), left wall 314, right wall 315, rear wall 318 and bottom wall 316. At least one connector cable 320 may be included within car charger, power component 300. Electrical connectors 330 may be used to link car charger, power component 300 to other components in the modular charging system of the present invention. As shown, cable 320 may include a central shaft 326 having a serial connection 338, such as a USB-C connector on the proximal end and a separate connector 322 at the distal end 332, such as a USB or Apple® Lightening connector. Cable 320 may also include a permanent magnet 234 which is attracted to permanent magnet 236 (as shown in FIG. 3B) mounded within car charger, power component 300 to releasably retain distal end 332 within recess 320. Car charger, power component 300 is suitable for charging electronic components such as phones, tablets, readers, and other low voltage devices via flexible cable 320. Separate cables may be used so that car charger, power component 300 may charge devices having different power inputs.

Figure 4D:
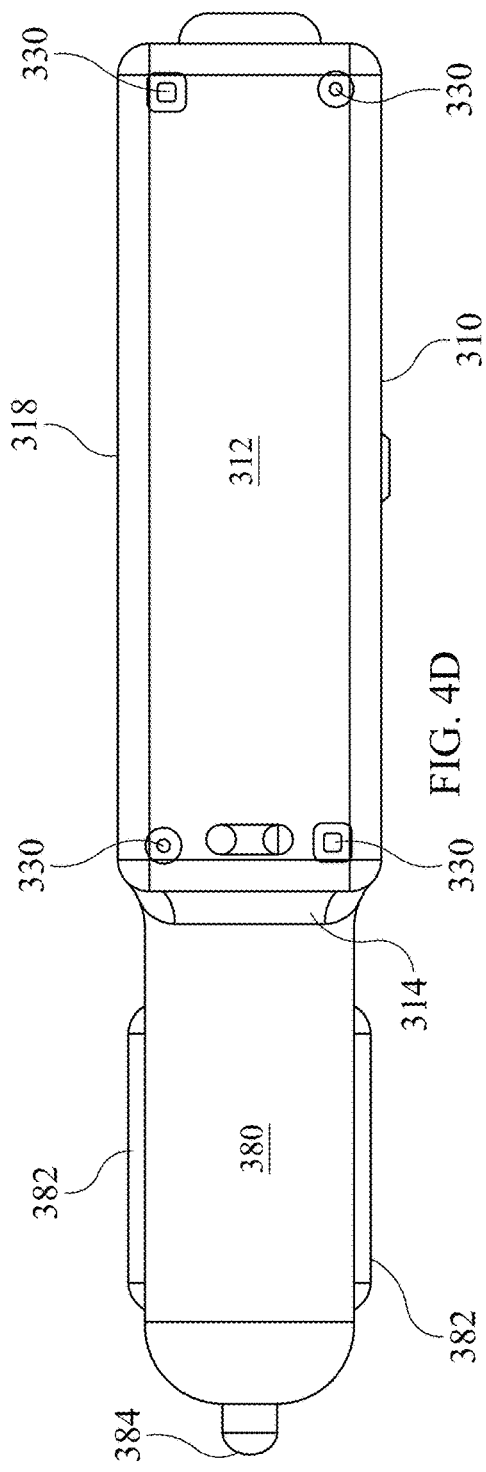
FIG. 4D is a top plan view of an accessory car charger suitable for use with a modular charging system in accordance with the present invention.

FIG. 4D shows a schematic of a car charger, power component 300 useful with the associated components of the present invention. Car charger, power component 300 includes front wall 310, top wall 312, left wall 314, right wall 315, rear wall 318 and bottom wall 316. Electrical connectors 330 may be used to link car charger, power component 300 to other components in the modular charging system of the present invention. LED flashlight 390 may be included on right wall 315 for emergency light. Barrel 380 extends from left wall 314 for insertion into a vehicle 12V charge port. Contacts 382, 384 extend from barrel 380 to make an electrical connection with the vehicle 12V port.

FIG. 4E shows a schematic of a car charger, power component 300 useful with the associated components of the present invention. Car charger, power component 300 includes front wall 310, top wall 312, left wall 314 (not shown), right wall 315, rear wall 318 and bottom wall 316. Extension type electrical connectors 330 on bottom wall 316 and indent type electrical connections (not shown) on top wall 312 may be used to link car charger, power component 300 to other components in the modular charging system of the present invention. Bus connections 388, such as USB-A or USB-C and LED flashlight 390 and may be included on right wall 315. Barrel 380 extends from left wall 314 for insertion into a vehicle 12V charge port. Contacts 382, 384 extend from barrel 380 to make an electrical connection with the vehicle 12V port.

FIG. 4F shows a car charger, power component 300 includes front wall 310, top wall 312, left wall 314, right wall 315, rear wall 318 (not shown) and bottom wall 316. Indent type electrical connectors 330 on top wall 312 (obscured) are used to link car charger, power component 300 to the bottom wall 18 of a wall charger 10 The charging device 10 includes a front face 12, a top wall 14, a right-side wall 16, a bottom wall 18, and a left side wall 20. Front face 12 includes an outlet plate that includes two outlets 22, each with a 120V AC "hot" receptacle 24, a neutral receptacle 26 and ground receptacle 28. The connections may be magnetized for secure connection to a charging base or the housing may include magnets for providing the connection. In the event that the connector pins are magnetic it may be useful to have an electronically conducting coating on the pins rather than relying on the magnetic material as the conductor. The housing of the car charger, power component 300 includes corresponding magnets so that the power device 300 may be removably but securely connected to the charging device. Leads 52, 54 connect power adaptor 50 to receptacle 24, 26 and blades 34, 36. Power adapter 50 is also connected to leads 54, 56, 58, 60 and 62 to power the extension type connections 30, and USB type connections 31 on the bottom wall 18. Leads 64, 66 power extension type connections 30 on the top wall 14 and lead 68 powers connection port 72, into which tip 70 may be inserted. Any other low voltage connections formed in the front face, top wall, sidewalls, or bottom wall may be connected to power adapter 50. Power connections 330 in car charger, power component 300 connect to power connections 30 in the wall charger 10 to charge the cells within the car charger, power component 300. Car charger, power component 300 may include a permanent magnet in the car charger, power component 300 or each connection 330 may be magnetized to provide a sturdy, but easily removable connection. LED flashlight 390 may be included on right wall 315 for emergency light. Barrel 380 extends from left wall 314 for insertion into a vehicle 12V charge port. Contacts 382, 384 extend from barrel 380 to make an electrical connection with the vehicle 12V port.

Figure 4G:
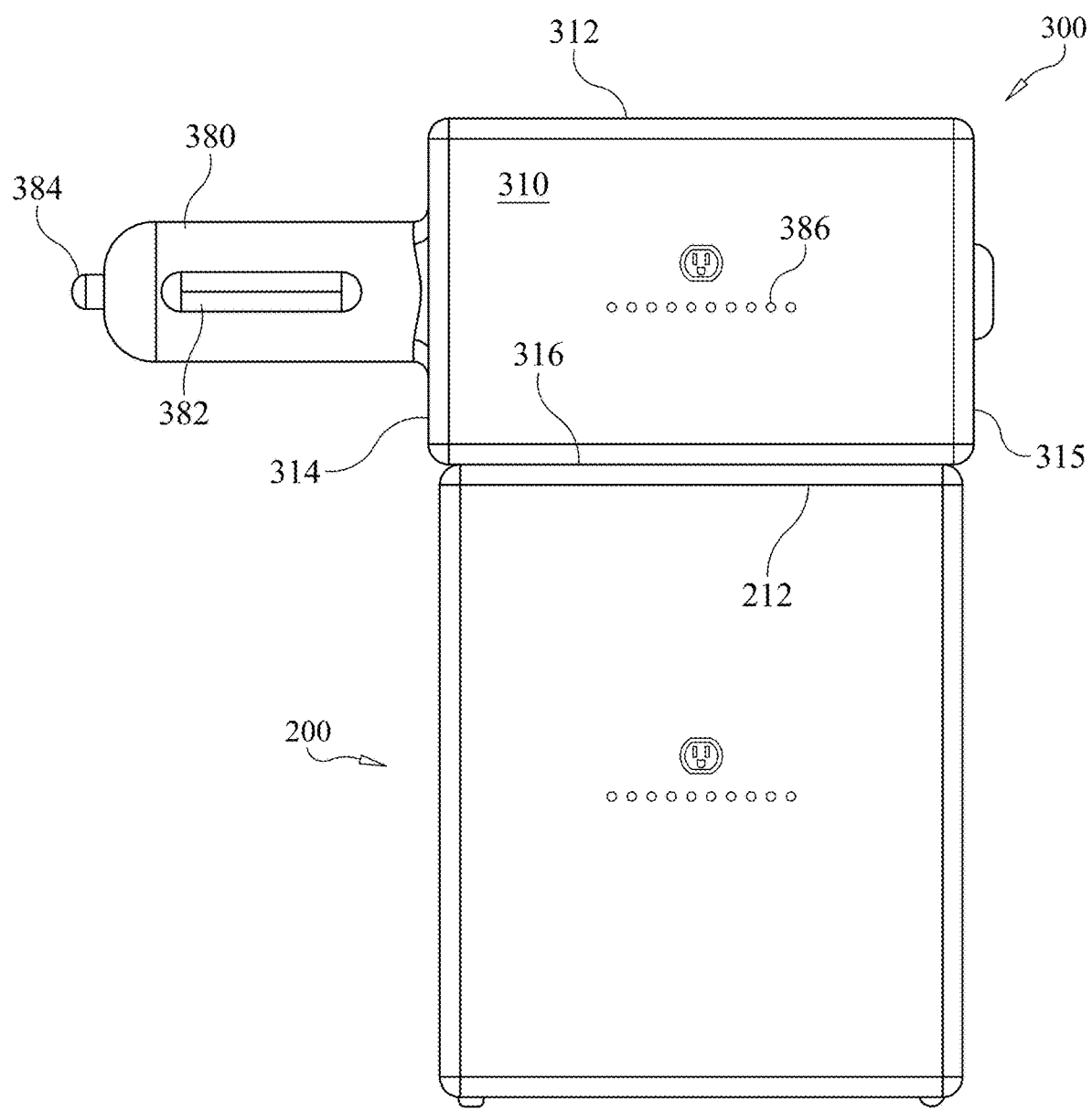
FIG. 4G is a front elevation view of an accessory car charger mounted to an accessory battery unit in accordance with the present invention.

FIG. 4G shows a car charger, power component 300 includes front wall 310, top wall 312, left wall 314, right wall 315, rear wall 318 (not shown) and bottom wall 316 connected to a battery pack 200. An LED flashlight 390 may be included on right wall 315 for emergency light. Barrel 380 extends from left wall 314 for insertion into a vehicle 12V charge port. Contacts 382, 384 extend from barrel 380 to make an electrical connection with the vehicle 12V port. Extension type electrical connectors 330 on bottom wall 316 (obscured) are used to link car charger, power component 300 to indent type electrical connectors 230 (also obscured) on top wall 212 of a battery block 200.

Figure 5A:
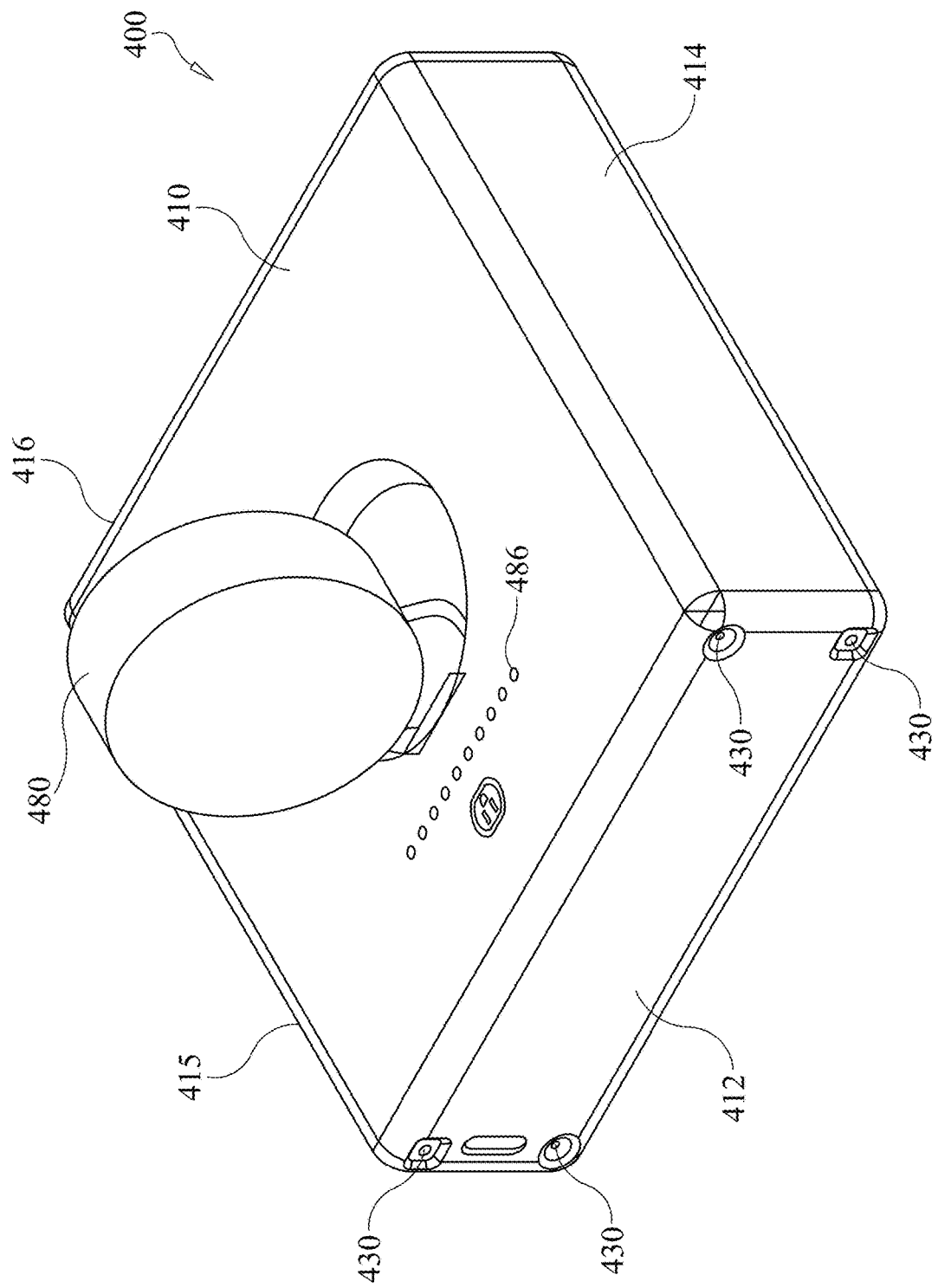
FIG. 5A is an upper perspective view of a portable charger unit for a wearable device in accordance with the present invention.

FIG. 5A shows a wearable device charger 400 suitable for use on with the charging system of the present invention. For example, wearable device charger 400 may be mounted on any of the charge carrying devices of the present system. Wearable device charger 400 includes a battery storage so a device such as a wearable device may be without a power cord of charge base. Wearable device charger 400 includes front wall 410, top wall 412, left wall 414, right wall 415, rear wall 418 and bottom wall 416. A retractable device support 380 extends from front wall 410. The wearable device is placed on retractable support 380 to provide power to the wearable device. Indent type electrical contacts 430 are shown on top wall 412. As shown, the contacts may have either a circular or square cross section. Charge monitor indicators 486 such as LED or LCDs.

Figure 5B:
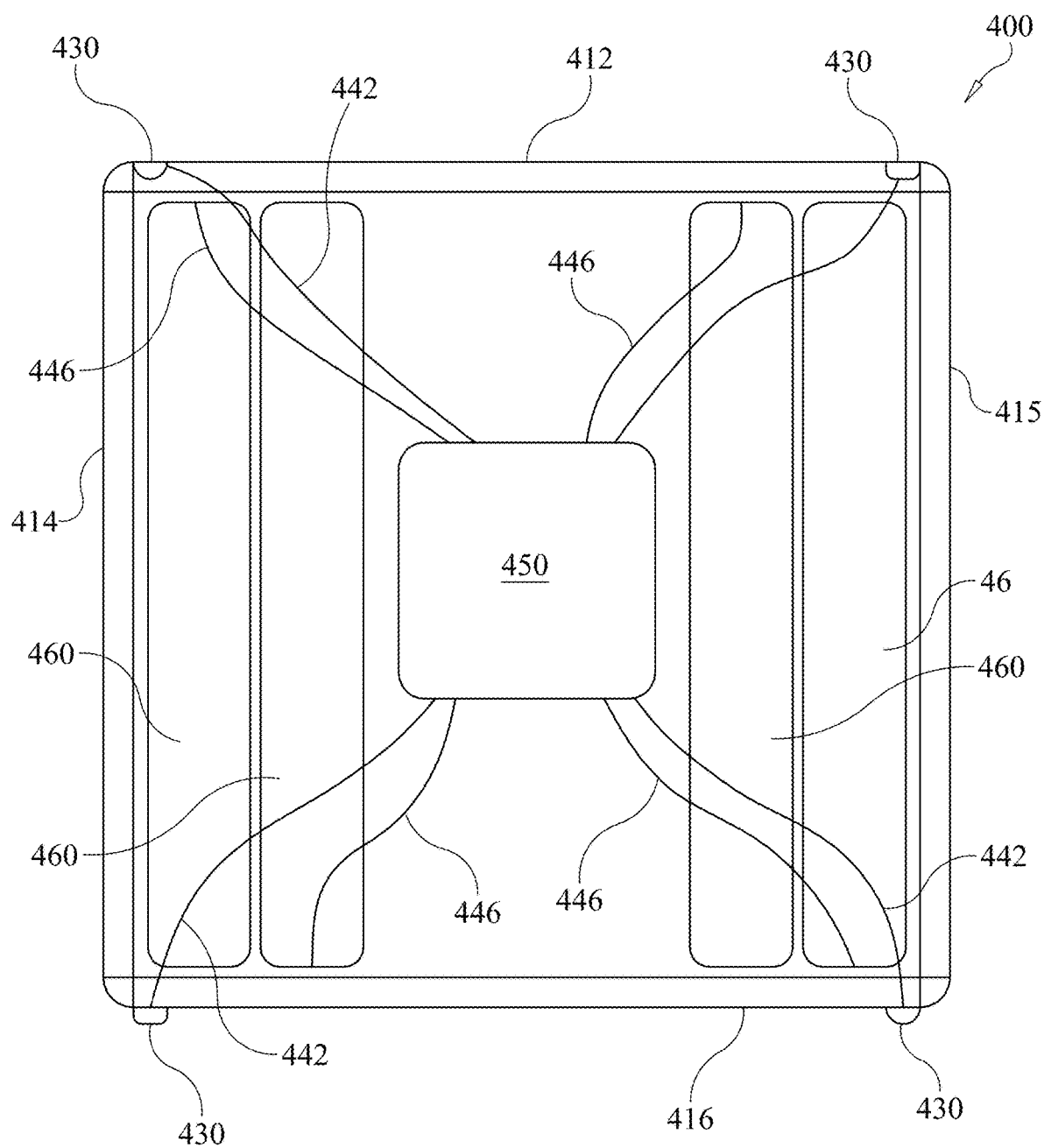
FIG. 5B is a schematic view of a portable charger for a wearable device unit in accordance with the present invention.

FIG. 5B shows a schematic of a wearable device charger 400 useful with the associated components of the present invention. Wearable device charger, power component 400 includes top wall 412, left wall 414, right wall 415, rear wall 418 (not shown) and bottom wall 416. A number of linked battery cells 460 are included within wearable device charger 400. Cells 460 may be linked in series or parallel, or in a combination of serial and parallel to provide the desired output. Integrated circuit power managers 450 are designed for various cell combinations and may monitor each cell individually and the output of the linked cells. Battery leads 446 link the positive and negative terminals of the power pack and provide power input to controller 450 and information to monitor the power output and remaining charge in cells 460. Leads 442 provide power to indent type and extension type electrical connectors 430 in opposed walls 412, 416.

Figure 5C:
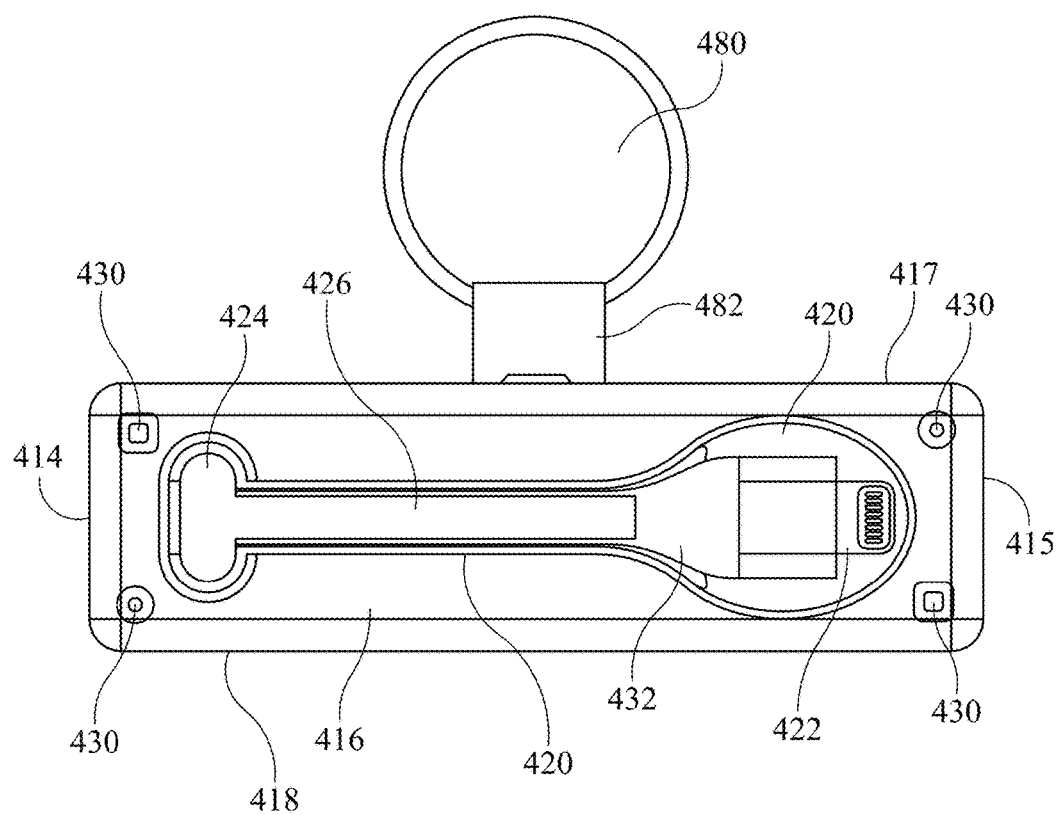
FIG. 5C is a lower elevation view of a portable charger unit for a wearable device in accordance with the present invention.

FIG. 5C shows a wearable device charger 400 useful with the associated components of the present invention. wearable device charger 400 includes front wall 410, top wall 412 (not shown), left wall 414, right wall 415, rear wall 418 and bottom wall 416. At least one connector cable 420 may be included within wearable device charger 400. Indent type and extension type electrical connectors 430 in opposed walls 412, 416 may be used to link wearable device charger 400 to other components in the modular charging system of the present invention. As shown, cable 420 may include a central shaft 426 having a serial connection 438, such as a USB-C connector on the proximal end and a separate connector 422 at the distal end 432, such as a USB or Apple® Lightening connector. Cable 420 may also include a permanent magnet 234 which is attracted to permanent magnet 236 (as shown in FIG. 3B) mounted within wearable device charger 400 to releasably retain distal end 432 within recess 417. wearable device charger 400 is suitable for charging electronic components such as phones, tablets, readers, and other low voltage devices via flexible cable 420. Separate cables may be used so that car charger, power component 400 may charge devices having different power inputs. Wearable device charger 400 includes charging support 480 mounted on a damped hinge 482 such that support 480 is depressed briefly to unlock hinge 482 and allow support 480 to deploy.

Figure 5D:
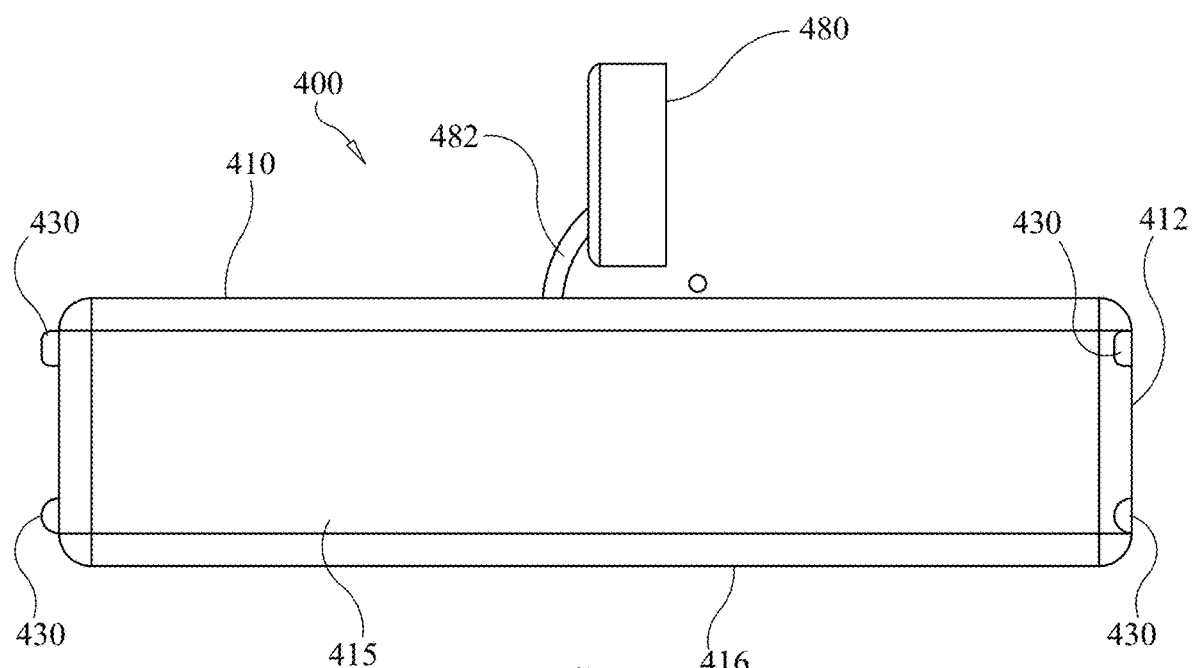
FIG. 5D is a side elevation view of a portable charger unit for a wearable device in accordance with the present invention.

FIG. 5D shows a wearable device charger 400 useful with the associated components of the present invention. wearable device charger 400 includes front wall 410, top wall 412, left wall 414 (not shown), right wall 415, rear wall 418 and bottom wall 416. Indent type and extension type electrical connectors 430 are located in opposed walls 412, 416. Wearable device charger 400 includes charging support 480 mounted on a damped hinge 482 such that support 480 is depressed briefly to unlock hinge 482 and allow support 480 to deploy.

Figure 5E:
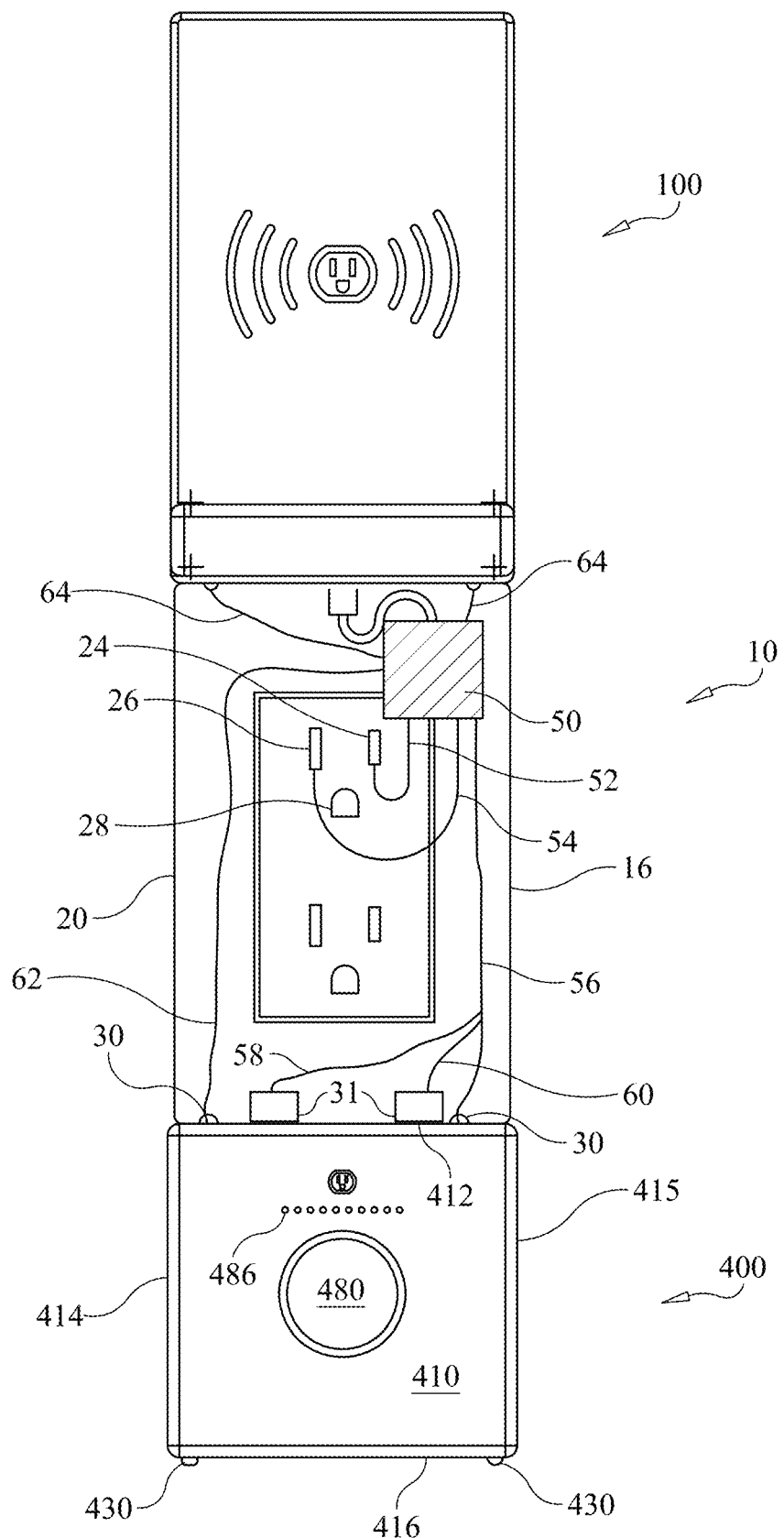
FIG. 5E is a front elevation view and partial schematic of a portable charger unit for a wearable device mounted to the underside of an outlet wall-mounted charging device, with a wireless charge unit mounted to the top side in accordance with the present invention.

FIG. 5E shows a wearable device charger 400 which includes front wall 410, top wall 412, left wall 414, right wall 415, rear wall 318 (not shown) and bottom wall 416. Indent type electrical connectors 430 on top wall 412 (obscured) are used to link wearable device charger 400 to extension type electrical connectors 30 on bottom wall 18 (obscured) of wall charger 10. The charging device 10 includes a front face 12, a top wall 14, a right-side wall 16, a bottom wall 18, and a left side wall 20. Front face 12 includes an outlet plate that includes two outlets 22, each with a 120V AC "hot" receptacle 24, a neutral receptacle 26 and ground receptacle 28. The connections may be magnetized for secure connection to a charging base or the housing may include magnets for providing the connection. In the event that the connector pins are magnetic it may be useful to have an electronically conducting coating on the pins rather than relying on the magnetic material as the conductor. The housing of wearable device charger 400 includes corresponding magnets so that the device charger 400 may be removably but securely connected to the charging device. Leads 52, 54 connect power adaptor 50 to receptacle 24, 26 and blades 34, 36. Power adapter 50 is also connected to leads 54, 56, 58, 60 and 62 to power extension type electrical connections 30, and USB-type connections 31 on the bottom wall 18. Leads 64, 66 power extension type electrical connections 30 on the top wall 14 and lead 68 powers connection port 72, into which tip 70 may be inserted. Any other low voltage connections formed in the front face, top wall, sidewalls, or bottom wall may be connected to power adapter 50. Indent type power connections 330 in wearable device charger 400 connect to extension type power connections 30 in the wall charger 10 to charge the cells within the wearable device charger 400. Wearable device charger 400 may include a permanent magnet in the wearable device charger 400 or each connection 330 may be magnetized to provide a sturdy, but easily removable connection.

Figure 5F:
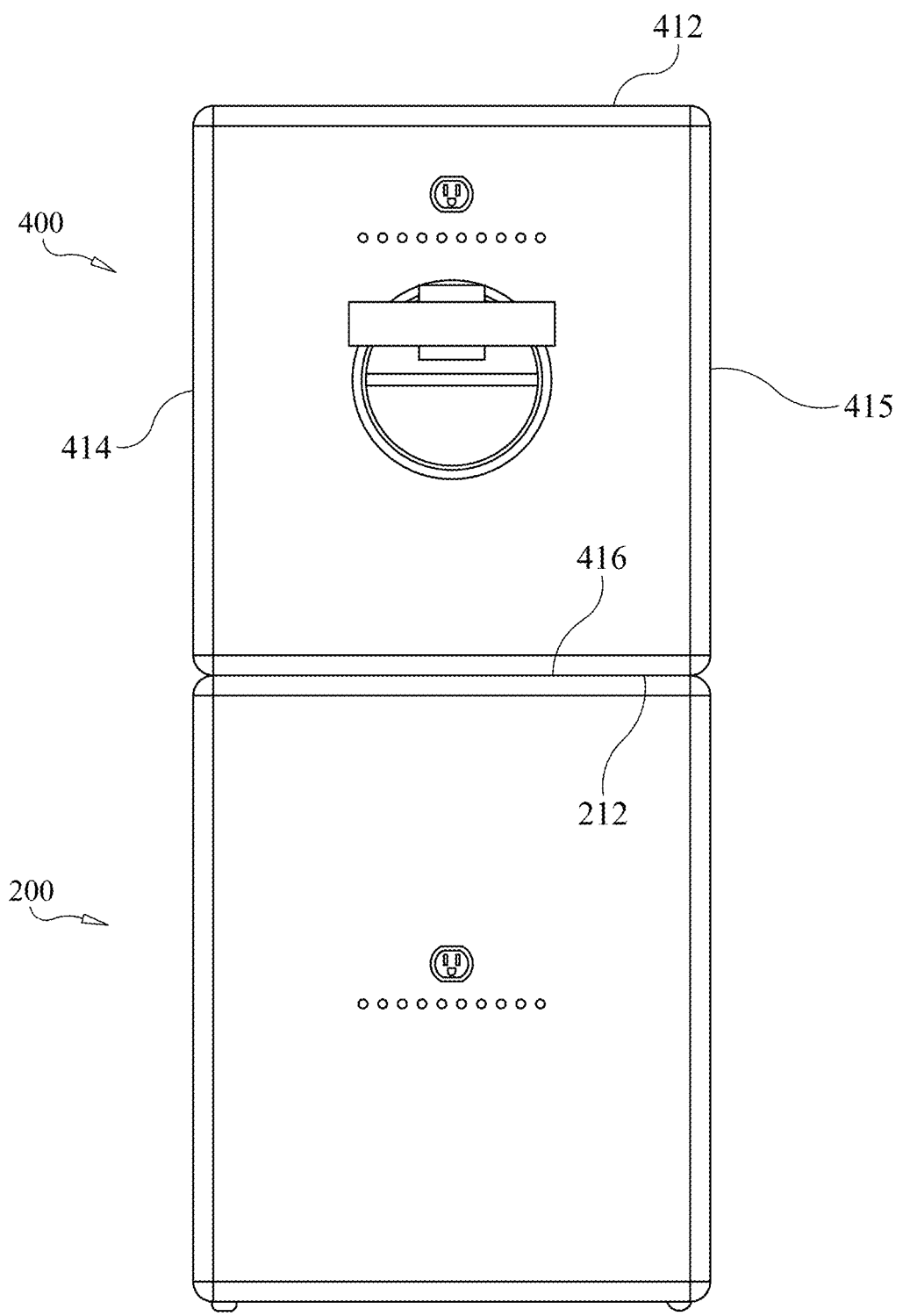
FIG. 5F is a front elevation view of a portable charger unit for a wearable device mounted to a battery block in accordance with the present invention.

FIG. 5F shows a wearable device charger 400 includes front wall 410, top wall 412, left wall 414, right wall 415, rear wall 418 (not shown) and bottom wall 416 connected to a battery pack 200. Electrical connectors 430 on bottom wall 316 (obscured) are used to link wearable device charger 400 to electrical connectors 230 (also obscured) on top wall 212 of a battery block 200.

Figure 6A:
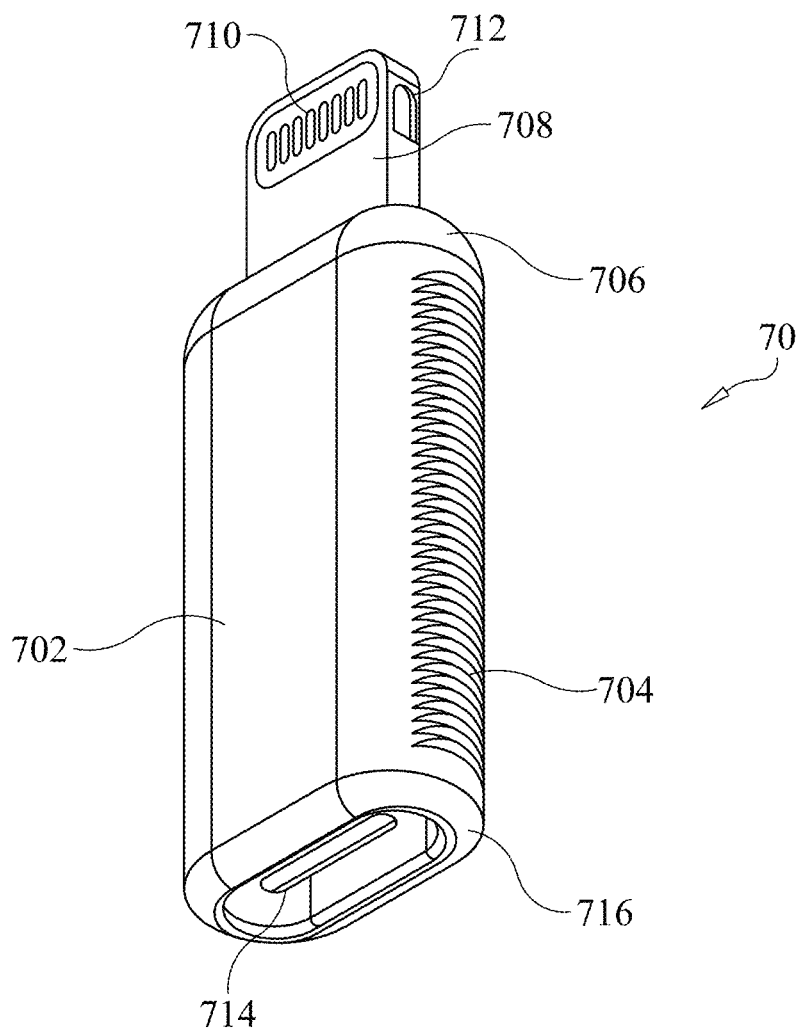
FIG. 6A is a lower perspective view of an Apple Lightening® (Apple, Inc.) style charge tip for use with a wall charger of a modular charging system in accordance with the present invention.

FIG. 6A shows a connector tip 70 for use in the present invention. Charging tip 70 is installed to form a charging dock that allows an electronic device to be placed atop charging device so that the device is charged in a convenient location without obstructing the outlets on outlet plate. Connector tip 70 includes a generally barrel shaped body 702 with side sections that include serrated sections 704 which mate to a congruent toothed section within receptacle 72 such that release button 42 (shown in FIG. 1E) disengages the serrated section 704 from the toothed section in receptacle 72 to allow the tip to be replaced. Tip body 702 includes a bus connection 714 in the lower end and shoulders 716 for ease of insertion into receptacle 72. Shoulders 706 may also be formed at the upper end of body 702. An Apple® Lightening connector is shown at the upper end of body 702. The Apple® Lightening connector includes an extension 708 and retention feature 712 and external contacts 710.

Figure 6B:
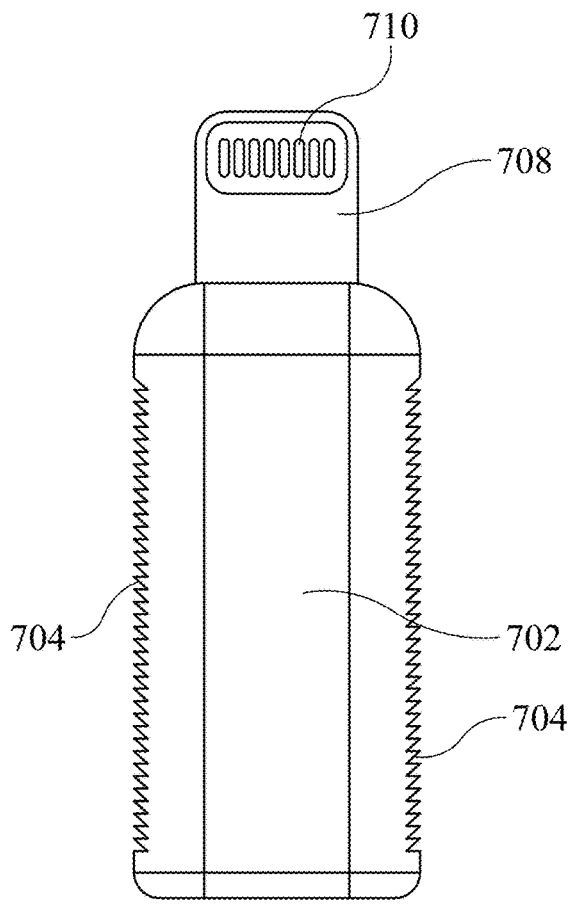
FIG. 6B is a plan view of an Apple® Lightening style charge tip for use with the wall charger of the modular charging the present invention.

FIG. 6B shows a connector tip 70 for use in the present invention. Charging tip 70 is installed to form a charging dock that allows an electronic device to be placed atop charging device so that the device is charged in a convenient location without obstructing the outlets on outlet plate. Connector tip 70 includes a generally barrel shaped body 702 with side sections that include serrated sections 704. Tip body 702 includes a bus connection 714 (not shown) in the lower end and shoulders 716 for ease of insertion into receptacle 72. Shoulders 706 may also be formed at the upper end of body 702. An Apple® Lightening connector is shown at the upper end of body 702. The Apple® Lightening connector includes an extension 708 and external contacts 710.

Figure 6C:
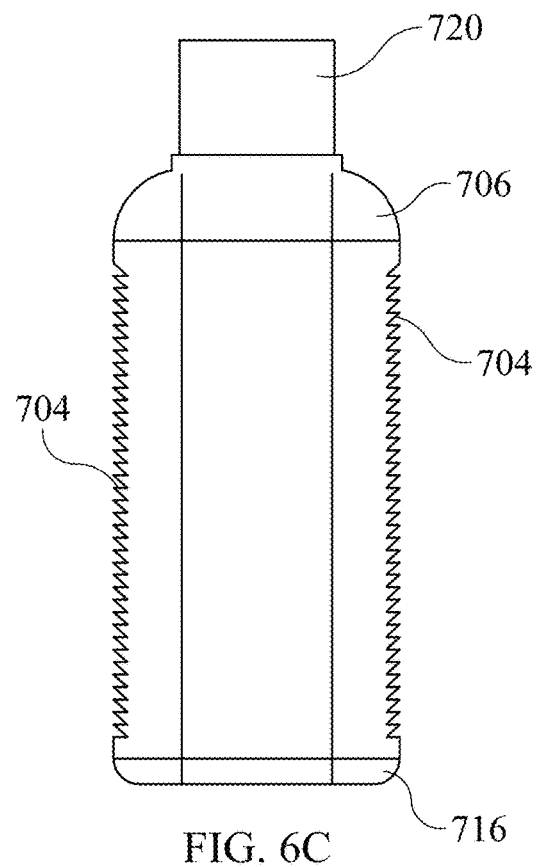
FIG. 6C is a plan view of an USB-C style charge tip for use with the wall charger of the modular charging the present invention.
Figure 6D:
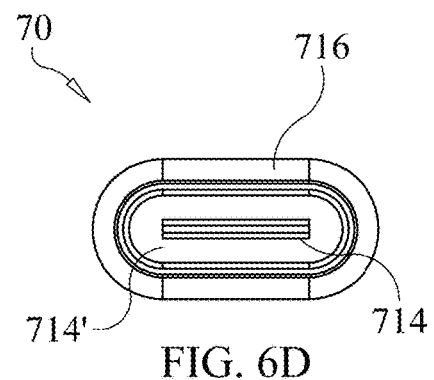
FIG. 6D is a lower plan view of a charge tip showing a USB-C connector for use with the wall charger of the modular charging the present invention.

FIG. 6C shows a connector tip 70 for use in the present invention. Charging tip 70 is installed to form a charging dock that allows an electronic device to be placed atop charging device so that the device is charged in a convenient location without obstructing the outlets on outlet plate. Connector tip 70 includes a generally barrel shaped body 702 with side sections that include serrated sections 704. Tip body 702 includes a bus connection 714 (not shown) in the lower end and shoulders 716 for ease of insertion into receptacle 72. Shoulders 706 may also be formed at the upper end of body 702. A USB-C connector is shown at the upper end of body 702.

FIG. 6A shows the base of a connector tip 70. Tip body 702 includes a bus connection 714 in the lower end and shoulders 716 for ease of insertion into receptacle 72. A female USB-C connector 714 is shown with a recess 714' surrounding the connection points.

Figure 7A:
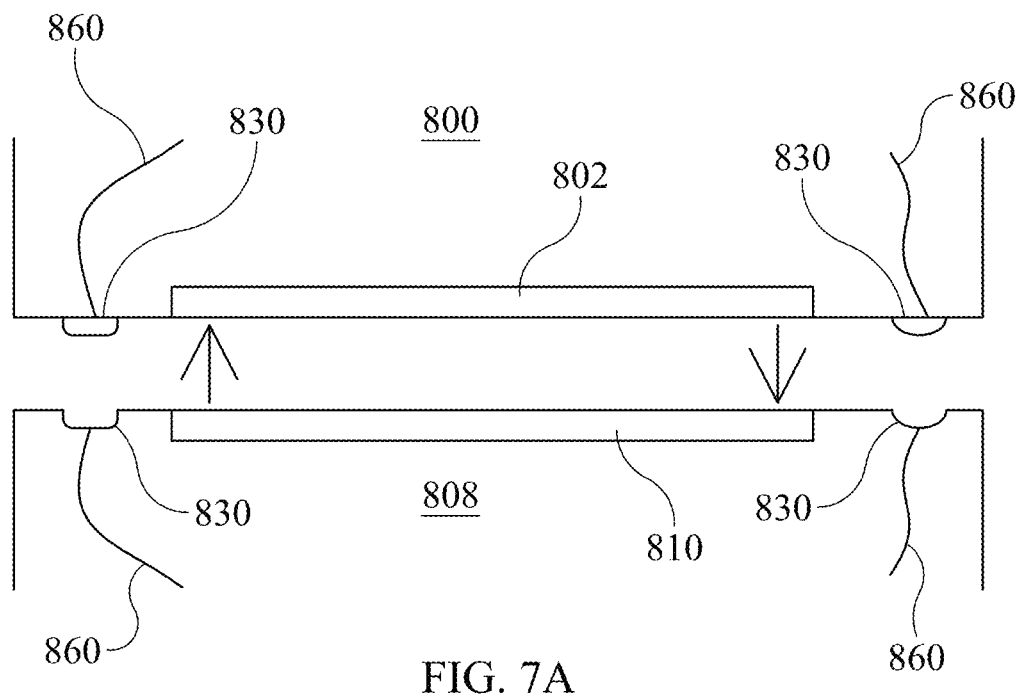
FIG. 7A shows a schematic view of one layout for magnetic attraction between adjacent devices.

FIG. 7A shows a schematic view of one layout for magnetic attraction between adjacent devices in which a first device 800 includes a permanent bar magnet 802, extension type electrical contacts 830 and leads 860. A second device 808 includes a permanent bar magnet 810, indent type electrical contacts 830 and leads 860 to contacts 830. The arrows show the magnetic attraction between the bar magnets 802, 810, which connects devices 800, 808 in a secure yet easily releasable manner. The indent type and extension type connections 830 are compatible shapes such that the two connections nest or conform to align devices 840, 850 such that an electrical connection is made and power is transmitted between adjacent devices.

Figure 7B:
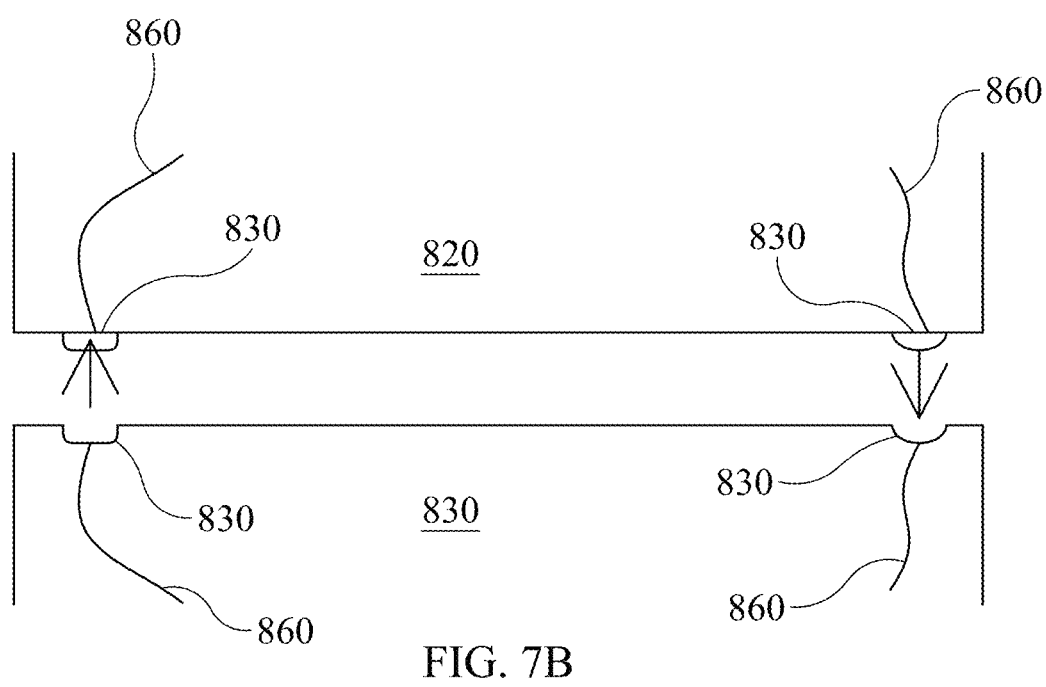
FIG. 7B shows another schematic view of one layout for magnetic attraction between adjacent devices.

FIG. 7B shows a schematic view of one layout for magnetic attraction between adjacent devices in which a first device 820 includes magnetized electrical extension type contacts 830 and leads 860 to contacts 830. A second device 808 includes magnetized indent type electrical contacts 830 and leads 860 to contacts 830. The arrows show the magnetic attraction between the magnetic electrodes 830, which connects devices 820, 830 in a secure yet easily releasable manner.

Figure 7C:
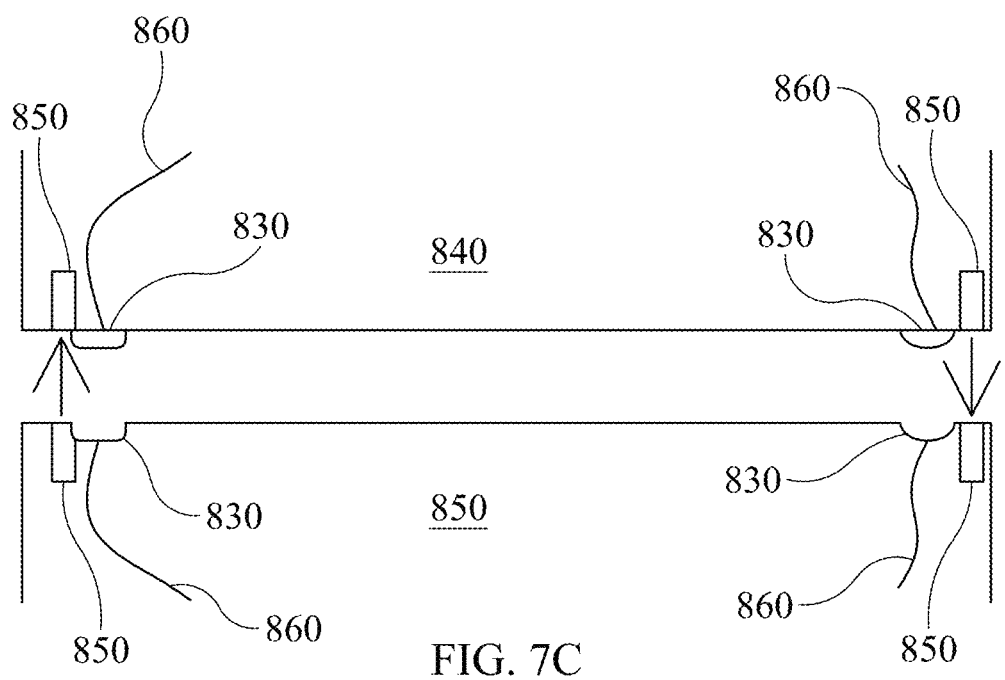
FIG. 7C shows yet another schematic view of one layout for magnetic attraction between adjacent devices.

FIG. 7C shows a schematic view of one layout for magnetic attraction between adjacent devices in which a first device 840 includes permanent bar magnets 850 located proximate to electrical extension type contacts 830 and leads 860 to contacts 830. A second device 850 includes permanent bar magnets 850 located proximate to indent type electrical contacts 830 and leads 860 to contacts 830. The arrows show the magnetic attraction between the bar magnets 850, which connects devices 800, 808 in a secure yet easily releasable manner.

The present invention allows a number of the devices to be charges simultaneously and allows a number of the devices to be connected to a single charge base.

A pair of USB jacks, which may be received within the base charger unit and schematic electrical components that connect to electrical contacts in the base surface of the adapter. A portable battery unit may be magnetically attached to the adapter for charging. Leads connect the jacks to a power adapter such as an iWatt iW1691-03 Adapter having an AC input of 90-264 VAC and an output of 5V at 2.1 AMPs. Any other suitable power adapter may be used. Leads connect power adaptor to the contacts on the base of the adapter. A stackable power device may be magnetically attached to the contacts. The jacks may be a standard USB, micro-USB, APPLE Lightening, USB-C, or any other auxiliary cable jack. The contacts may be magnetized for secure connection to a charging base or the housing may include a magnet for providing the connection. In the event that the connector pins are magnetic, it may be useful to have an electronically conducting coating on the pins rather than relying on the magnetic material as the conductor. A charge indicator, such as LEDs or LCDs, may be included in the housing to indicate that a connection is made with a charging base or the status of the charge in the stackable power device.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

I claim:

1. A modular system of charging devices configured to join separate charging devices, the system comprising:
a first charging device; and
a second charging device, wherein:
the first charging device comprises:
first and second opposed major surfaces and first and second opposed minor surfaces;
a magnetic connector adapted to physically connect to the second charging device; and
a first electrical connection for electrically connecting the first charging device to the second charging device; and
the second charging device comprises:
first and second opposed major surfaces and first and second opposed minor surfaces;
an electrical charging port for connecting a digital device;
a magnetic connector adapted to physically connect to the first charging device; and
a second electrical connection adapted to electrically connect to the first electrical connection of the first charging device;
a battery storage; and
a barrel extension, the barrel extension extending from a first minor surface, the barrel extension adapted for insertion into a vehicle 12V charge port; and
contacts extending from the barrel to effect an electrical connection with a vehicle 12V port.

2. The modular system of charging devices of claim 1, wherein the first charging device further comprises:
a battery storage.

3. The modular system of charging devices of claim 1, wherein the first charging device further comprises:
an electrical charging port on at least one minor surface, the electrical charging port adapted to connect to a digital device.

4. The modular system of charging devices of claim 1, wherein the first charging device further comprises:
at least one electrical connection located on the first major surface.

5. The modular system of charging devices of claim 4, wherein the first charging device further comprises:
at least one electrical connection located on the first major surface.

6. The modular system of charging devices of claim 5, wherein the at least one electrical connection located on the first major surface of the first charging device is a wireless charger for connection to an electrical device.

7. The modular system of charging devices of claim 6, wherein wireless charger for connection to an electrical device is a Qi standard wireless charging device.

8. The modular system of charging devices of claim 1, wherein the second charging device further comprises:
at least one electrical connection located on the first major surface.

9. The modular system of charging devices of claim 8, wherein the at least one electrical connection located on the first major surface of the first charging device is a wireless charger for connection to an electrical device.

10. The modular system of charging devices of claim 9, wherein wireless charger for connection to an electrical device is a Qi standard wireless charging device.

11. The modular system of charging devices according to claim 1, wherein the first charging device electrical charging port is adapted to receive a charging cable.

12. The modular system of charging devices according to claim 1, wherein the second charging device electrical charging port is adapted to receive a charging cable.

13. The modular system of charging devices of claim 1, wherein the first and second charging devices each further comprises a power manager.

14. The modular system of charging devices of claim 1, wherein at least one of said first and second charging devices further comprises a power manager.

15. The modular system of charging devices of claim 1, wherein at least one of said first and second charging devices further comprises a power cord suitable for electrical connection to a power port of a digital device.

16. The modular system of charging devices of claim 1, wherein the first charging device magnetic connector includes a pair of electrodes for receiving power from a pair of electrodes in the second charging device magnetic connector.

17. The modular system of charging devices of claim 16, wherein the pair of electrodes for receiving power comprise charge connection pins.

18. A charging device configured to be configured to join separate charging devices in a modular system, the device comprising:
- first and second opposed major surfaces and first and second opposed minor surfaces;
- an electrical charging port for connecting a digital device;
- a magnetic connector adapted to physically connect the charging device to another modular system;
- at least one electrical connection adapted to electrically connect to the electrical connection of a separate charging device in a modular system;
- a battery storage;
- a barrel extension, the barrel extension extending from a first minor surface, the barrel extension adapted for insertion into a vehicle 12V charge port; and
- contacts extending from the barrel extension to effect an electrical connection with a vehicle 12V port.

19. The charging device of claim 18, wherein the at least one electrical connection is a wireless charger located on the first major surface of the charging device.

20. The charging device of claim 18, wherein the at least one electrical connection is a Qi standard wireless charging device.

21. The charging device of claim 18, wherein the charging device further comprises: at least one electrical connection located on the first major surface.

22. The charging device of claim 18, wherein the charging device electrical charging port is adapted to receive a charging cable.

23. The charging device of claim 18, wherein the charging device further comprises a power manager.

24. The charging device of claim 18, the charging device further comprises a power cord suitable for electrical connection to a power port of a digital device.

25. The charging device of claim 18, wherein the charging device magnetic connector includes a pair of electrodes for receiving power from a pair of electrodes in a separate charging device in the modular system.

26. The charging device of claim 25, wherein the pair of electrodes for receiving power comprise charge connection pins.

* * * * *